(12) United States Patent
Chen et al.

(10) Patent No.: US 11,171,544 B2
(45) Date of Patent: Nov. 9, 2021

(54) MECHANICAL ENERGY HARVESTING SYSTEM FOR CONVERTING KINETIC ENERGY OF A USER HAVING A TRUNK AND LIMB PORTIONS INTO ELECTRICITY

(71) Applicants: Long-Wen Chen, Taipei (TW); Hsin-Yu Chen, Taipei (TW); Ping-Han Chen, Taipei (TW)

(72) Inventors: Long-Wen Chen, Taipei (TW); Hsin-Yu Chen, Taipei (TW); Ping-Han Chen, Taipei (TW)

(*) Notice: Subject to any disclaimer, the term of this patent is extended or adjusted under 35 U.S.C. 154(b) by 0 days.

(21) Appl. No.: 16/876,156

(22) Filed: May 18, 2020

(65) Prior Publication Data
US 2021/0194322 A1 Jun. 24, 2021

(30) Foreign Application Priority Data
Dec. 20, 2019 (CN) .......................... 201922319945.0

(51) Int. Cl.
| | |
|---|---|
| *H02K 7/06* | (2006.01) |
| *H02K 7/18* | (2006.01) |
| *H02K 7/116* | (2006.01) |
| *H02K 11/00* | (2016.01) |
| *H02K 11/21* | (2016.01) |
| *H02K 49/10* | (2006.01) |
| *F03G 5/06* | (2006.01) |

(52) U.S. Cl.
CPC ............ *H02K 7/1853* (2013.01); *H02K 7/06* (2013.01); *H02K 7/116* (2013.01); *H02K 11/0094* (2013.01); *H02K 11/21* (2016.01); *H02K 49/108* (2013.01); *F03G 5/06* (2013.01)

(58) Field of Classification Search
CPC ........ H02K 7/1853; H02K 7/06; H02K 7/116; H02K 11/0094; H02K 11/21; H02K 49/108; F16H 1/20; F16H 25/20; F16H 37/12; F16H 2025/2028; F16H 2025/2043; F16H 2025/2071; F16D 7/00; H02J 7/00; F03G 5/06
USPC ...................................... 290/1 R, 1 C; 482/2
See application file for complete search history.

(56) References Cited

U.S. PATENT DOCUMENTS

| | | | | |
|---|---|---|---|---|
| 5,358,461 | A * | 10/1994 | Bailey, Jr. .......... | A63B 21/0552 482/2 |
| 7,652,386 | B2 * | 1/2010 | Donelan .............. | H02K 7/1853 290/1 R |
| 9,057,361 | B2 * | 6/2015 | Donelan ................... | F03G 5/00 |
| 10,291,099 | B1 * | 5/2019 | Huglen ................. | H02J 7/1415 |

(Continued)

*Primary Examiner* — Tulsidas C Patel
*Assistant Examiner* — S. Mikailoff
(74) *Attorney, Agent, or Firm* — McClure, Qualey & Rodack, LLP

(57) ABSTRACT

A mechanical energy harvesting system includes a base seat unit, a rotating shaft device, and a driving device. The base seat unit includes first and second seat bodies. The rotating shaft device is rotatably mounted to the first seat body. The driving device is disposed on the base seat unit and includes at least one driving unit sleeved on the rotating shaft device for driving the rotating shaft device to rotate and thus generate rotational kinetic energy, and at least one transmission unit connected between the second seat body and the driving unit and configured to drive the rotating shaft device to rotate when the second seat body swings relative to the first seat body, so as to generate the rotational kinetic energy.

18 Claims, 17 Drawing Sheets

(56) References Cited

U.S. PATENT DOCUMENTS

| | | | |
|---|---|---|---|
| 10,507,351 B2* | 12/2019 | Krishnan | A63B 23/0464 |
| 10,982,661 B2* | 4/2021 | Mullins | H02K 7/14 |
| 2008/0277943 A1* | 11/2008 | Donelan | F03G 5/00 |
| | | | 290/1 R |
| 2020/0021216 A1* | 1/2020 | Talarico | H02P 9/02 |
| 2021/0048007 A1* | 2/2021 | Mullins | H02K 7/14 |

* cited by examiner

MECHANICAL ENERGY HARVESTING SYSTEM FOR CONVERTING KINETIC ENERGY OF A USER HAVING A TRUNK AND LIMB PORTIONS INTO ELECTRICITY

CROSS-REFERENCE TO RELATED APPLICATION

This application claims priority to Chinese Patent Application No. 201922319945.0 filed on Dec. 20, 2019.

FIELD

The disclosure relates to an energy harvesting system, more particularly to a mechanical energy harvesting system.

BACKGROUND

Recently, the demand for 3C electronic products has increased greatly, and the penetration rate of electronic products is almost to the extent that each person has an electronic product. Electronic products such as a smart phone, a tablet computer, a walkman, and a digital camera, require batteries to provide electricity. However, the batteries provide a limited amount of electricity. In order to continuously use the electronic products, some people carry a portable battery charger to recharge the batteries (if applicable) of the electronic products. Nevertheless, once the electricity of the portable battery charger runs out, it is still not able to use electronic products.

SUMMARY

Therefore, an object of the disclosure is to provide a mechanical energy harvesting system for converting kinetic energy into electricity.

According to one aspect of the disclosure, a mechanical energy harvesting system is provided to include a base seat unit, a rotating shaft device, and a driving device. The base seat unit includes a first seat body and a second seat body reciprocally swingable relative to the first seat body. The rotating shaft device is rotatably mounted to the first seat body. The driving device is disposed on the base seat unit and includes at least one driving unit and at least one transmission unit. The at least one driving unit is sleeved on the rotating shaft device for driving the rotating shaft device to rotate and thus generate rotational kinetic energy. The at least one transmission unit is connected between the second seat body and the driving unit and is configured to drive the rotating shaft device to rotate when the second seat body swings relative to the first seat body, so as to generate the rotational kinetic energy.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
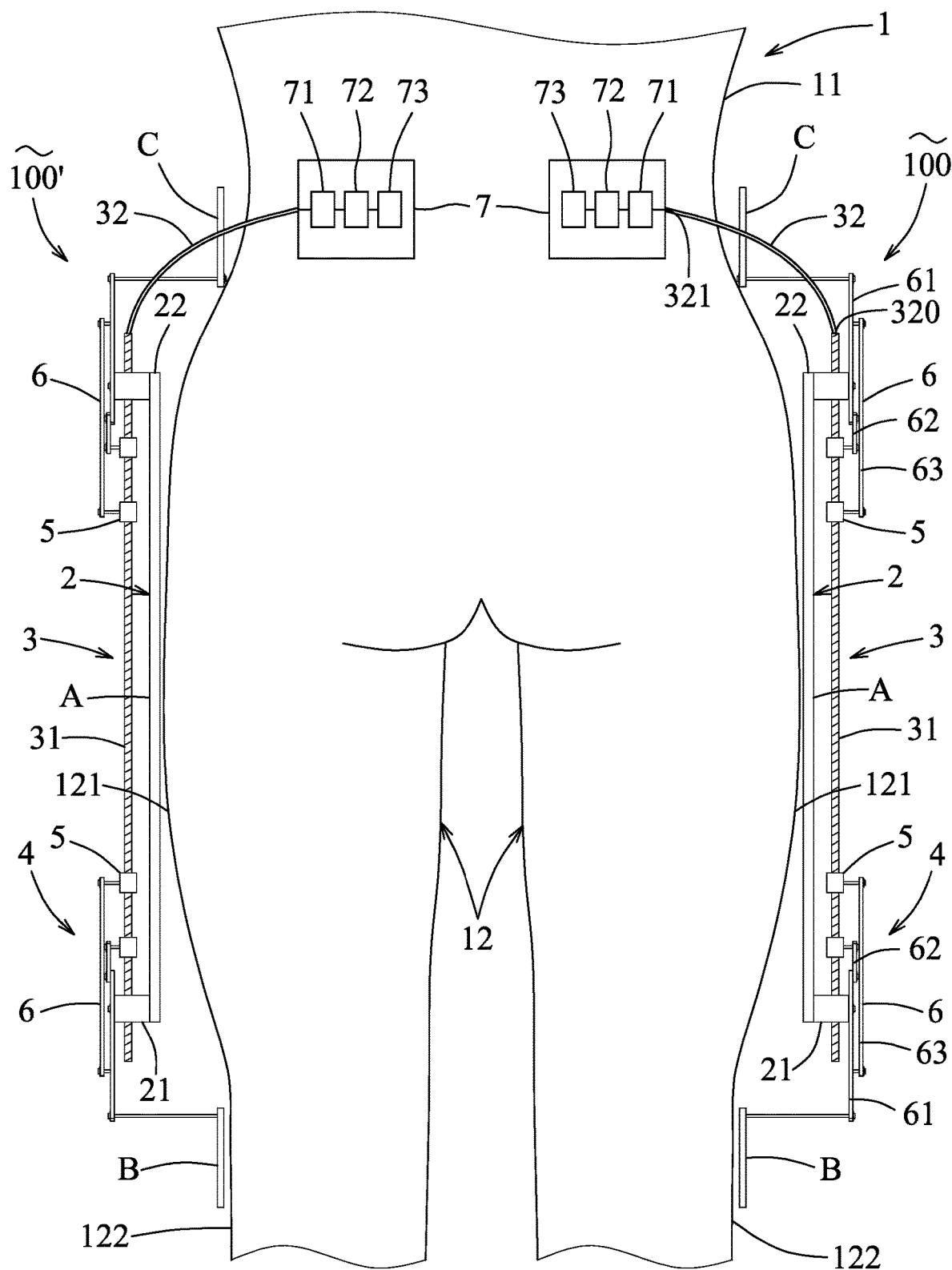
FIG. 1 is a schematic rear view of two mechanical energy harvesting systems according to a first embodiment of the present disclosure respectively worn on left and right sides of a user.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
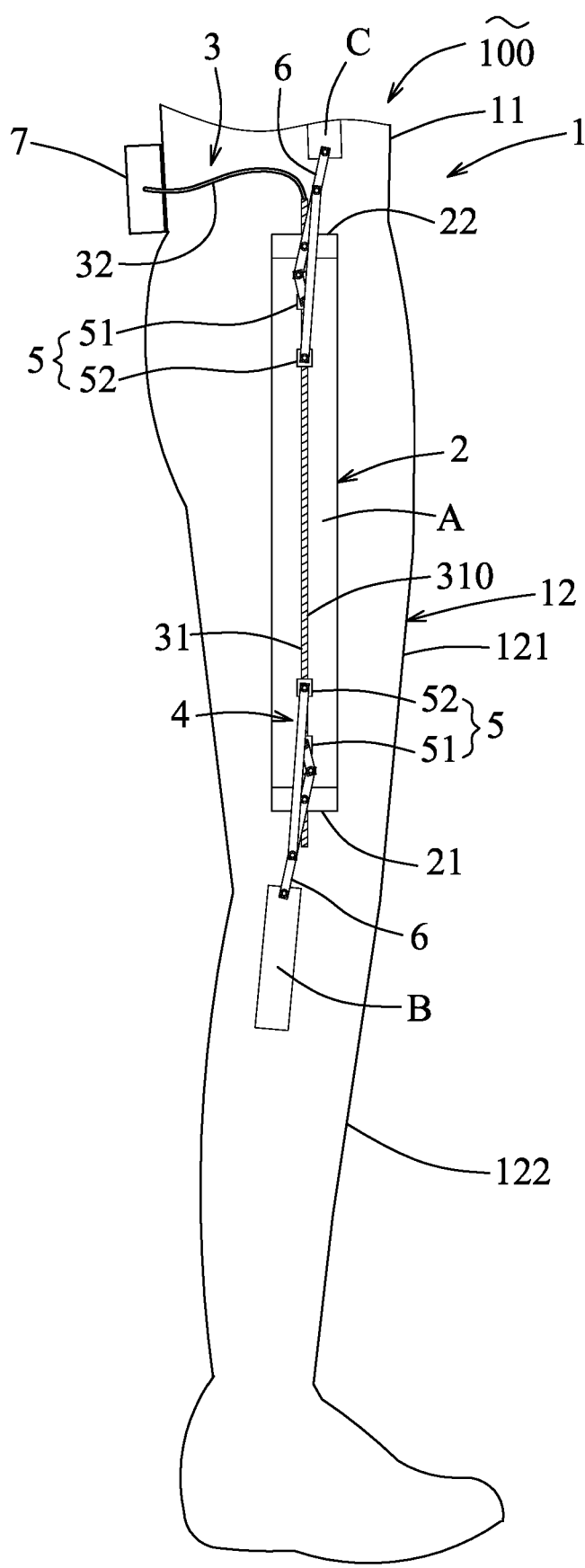
FIG. 2 is a schematic side view of one of the mechanical energy harvesting systems according to the first embodiment worn on the right side of the user, illustrating two transmission units of the first embodiment being in a first structural configuration.
Figure 3:
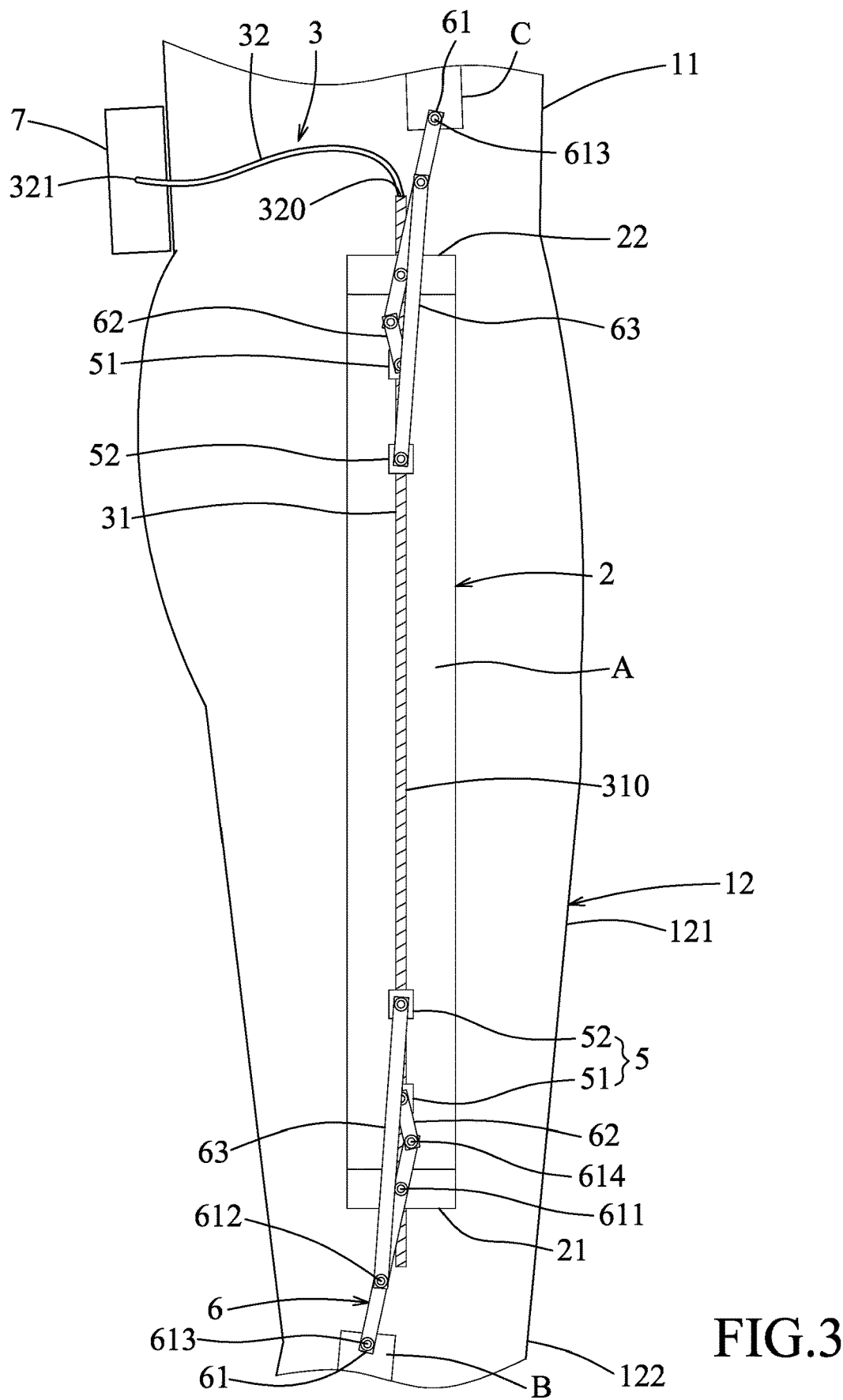
FIG. 3 is a fragmentary partly enlarged view of FIG. 2.

Referring to FIGS. 1-3, two mechanical energy harvesting systems 100, 100' of a first embodiment according to the present disclosure are respectively worn on left and right sides of a user 1. The user 1 has a trunk 11 (upper body) and left and right lower limbs 12 articulated to the trunk 11. Each of the lower limbs 12 includes a first limb portion 121 swingable relative to the trunk 11 and a second limb portion 122 swingable relative to the first limb portion 121. In this embodiment, the first limb portion 121 and the second limb portion 122 are, for example, the thigh and the calf. The mechanical energy harvesting systems 100, 100' can be detachably mounted on the trunk 11 and the lower limbs 12 by elastic bands, ropes or can be disposed in a sheath to be attached to the user 1. Although the user 1 wears two mechanical energy harvesting systems 100, 100' respectively on the left and right lower limbs 12, but the present disclosure is not limited to the disclosure herein and the user 1 may wear only one mechanical energy harvesting system 100.

Each mechanical energy harvesting system 100, 100' includes a base seat unit 2, a first rotating shaft device 3, a driving device 4, and a generator device 7. The two mechanical energy harvesting systems 100, 100' shown in FIG. 1 may share one generator device or include their respective generator devices 7 and the present disclosure is not limited in this respect. In this embodiment, the mechanical energy harvesting system 100, 100' share one generator device 7 that is detachably worn on a waist region of the user 1. In the following description, since the structures of the mechanical energy harvesting systems 100, 100' are substantially the same, only one of the mechanical energy harvesting systems 100 with respect to the corresponding (right) one of the lower limbs 12 will be described for the sake of brevity.

As shown in FIG. 2, the base seat unit 2 includes a first seat body (A), a second seat body (B) and a third seat body (C). The first seat body (A) is mounted on the first limb portion 121 of the lower limb 12, has a first end 21 adjacent to the second limb portion 122 and a second end 22 opposite to the first end 21 and adjacent to the trunk 11. The second seat body (B) is mounted on the second limb portion 122 adjacent to a knee joint of the lower limb 12. The third seat body (C) is mounted on the trunk 11 adjacent to a hip joint of the user 1.

The first rotating shaft device 3 is rotatably mounted to the first seat body (A) and includes a rotating shaft 31 and a flexible shaft 32. The rotating shaft 31 has an externally threaded outer surface 310 and extends through the first end 21 and the second end 22 of the first seat body (A). The flexible shaft 32 has first and second end portions 320, 321 (see FIG. 3) connected respectively to the rotating shaft 31 and the generator device 7, and is driven to rotate by the rotating shaft 31 for transmitting the rotational kinetic energy to the generator device 7.

The driving device 4 includes two first driving units 5 and two first transmission units 6. The first driving units 5 are sleeved on the rotating shaft 31 respectively adjacent to the first and second ends 21, 22 of the first seat body (A) for driving the first rotating shaft device 3 to rotate and so as to generate rotational kinetic energy. The first transmission units 6 are connected respectively to the first driving units 5 and are connected respectively to the second seat body (B) and the third seat body (C). Each of the first transmission units 6 is configured to drive the first rotating shaft device 3 to rotate when the respective one of the second and third seat bodies (B, C) connected thereto swings relative to the first seat body (A), so as to generate the rotational kinetic energy. In this embodiment, the second and third seat bodies (B, C) are disposed respectively on the trunk 11 and the second limb portion 122 (the calf of the user 1), and the first seat body (A) is disposed on the first limb portion 121 (the thigh of the user 1). In the following, since the structures of the first transmission units 6 are substantially the same, and so as the first driving units 5, only one of the first transmission units 6 that is connected to the second seat body (B) and the respective one (i.e., the lower one) of the first driving units 5 connected to the one of the first transmission units 6 will be described. The number of the first transmission units 6 and the first driving units 5 is not limited to two and can be one in other embodiments of this embodiment as long as the number of the first transmission unit 6 and the first driving unit 5 is the same.

Figure 4:
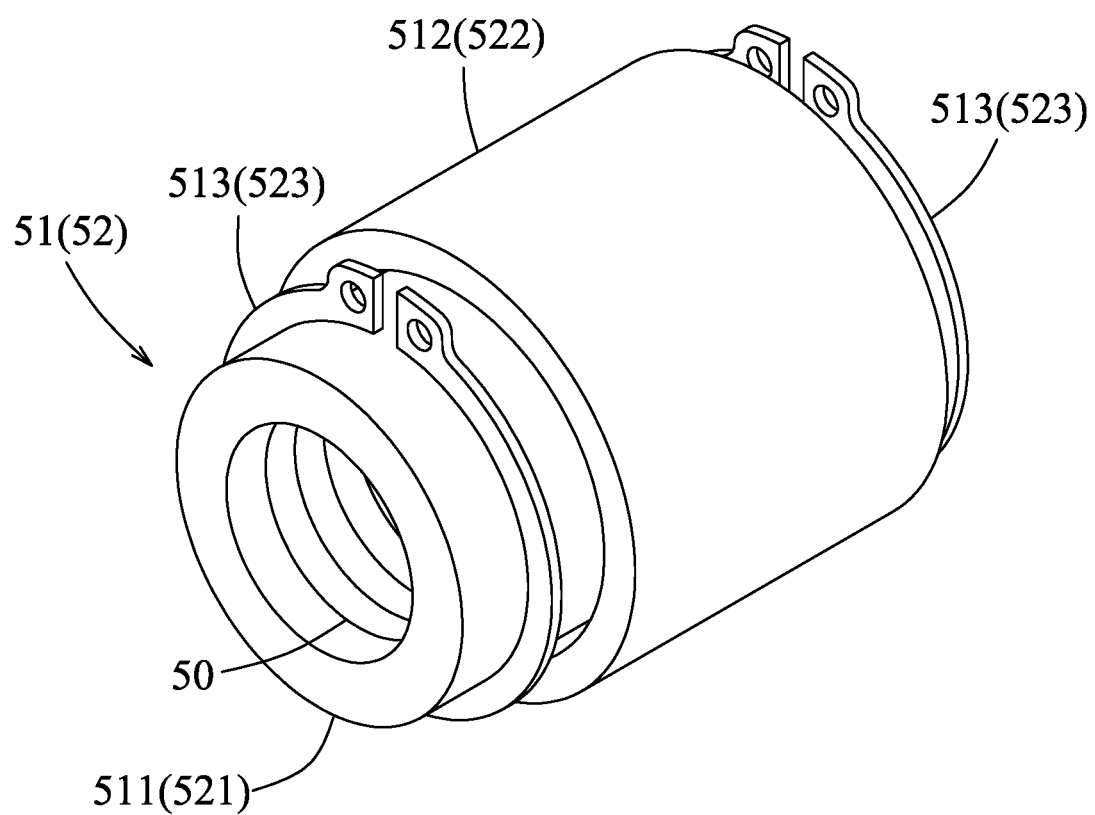
FIG. 4 is a perspective view of a driving component of the mechanical energy harvesting system according to the first embodiment.

Further referring to FIG. 4, the first driving unit 5 includes first and second driving components 51, 52 connected to the first transmission unit 6 and sleeved on the rotating shaft 31. Note that since the structures of the first and second driving components 51, 52 are the same, only one of the first and second driving components 51, 52 is shown in FIG. 4. The first driving component 51 is adjacent to the first end 21 of the first seat body (A) and the second driving component 52 is opposite to the first driving component 51 along the rotating shaft 31. As shown in FIG. 4, each of the first and second driving components 51, 52 includes a cylinder 511, 521 that is formed with an internally threaded surface 50 threadedly engaging the externally threaded outer surface 310 of the rotating shaft 31, a ratchet sleeve 512, 522 that is sleeved on the cylinder 511, 521 of the respective one of the first and second driving components 51, 52. The ratchet sleeve 512, 522 is formed with an internal ratchet for allowing rotation of the cylinder 511, 521 in a single direction.

Figure 5:
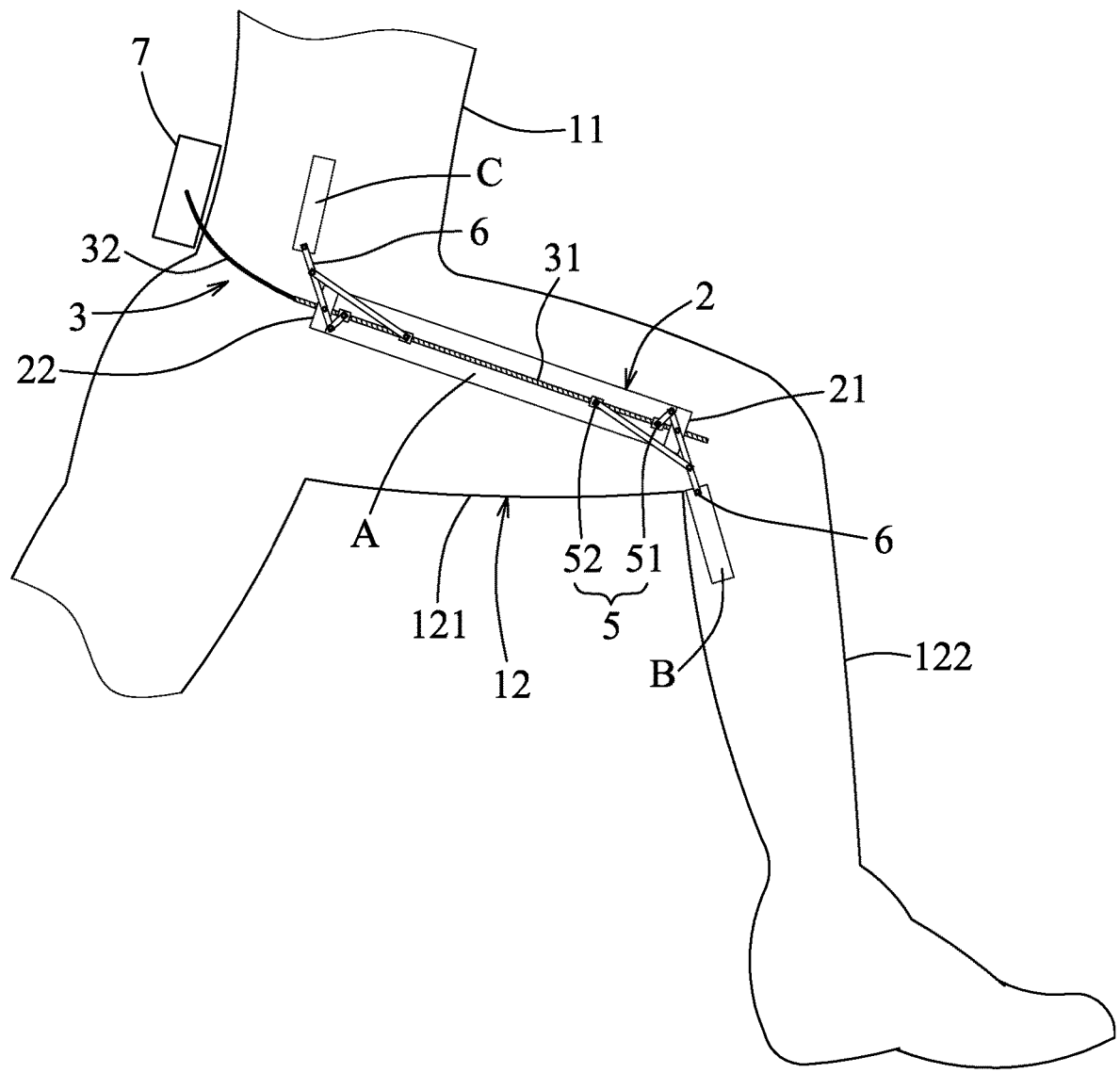
FIG. 5 is a schematic side view of the one of the mechanical energy harvesting system according to the first embodiment, illustrating the transmission units being in a second structural configuration.
Figure 6:
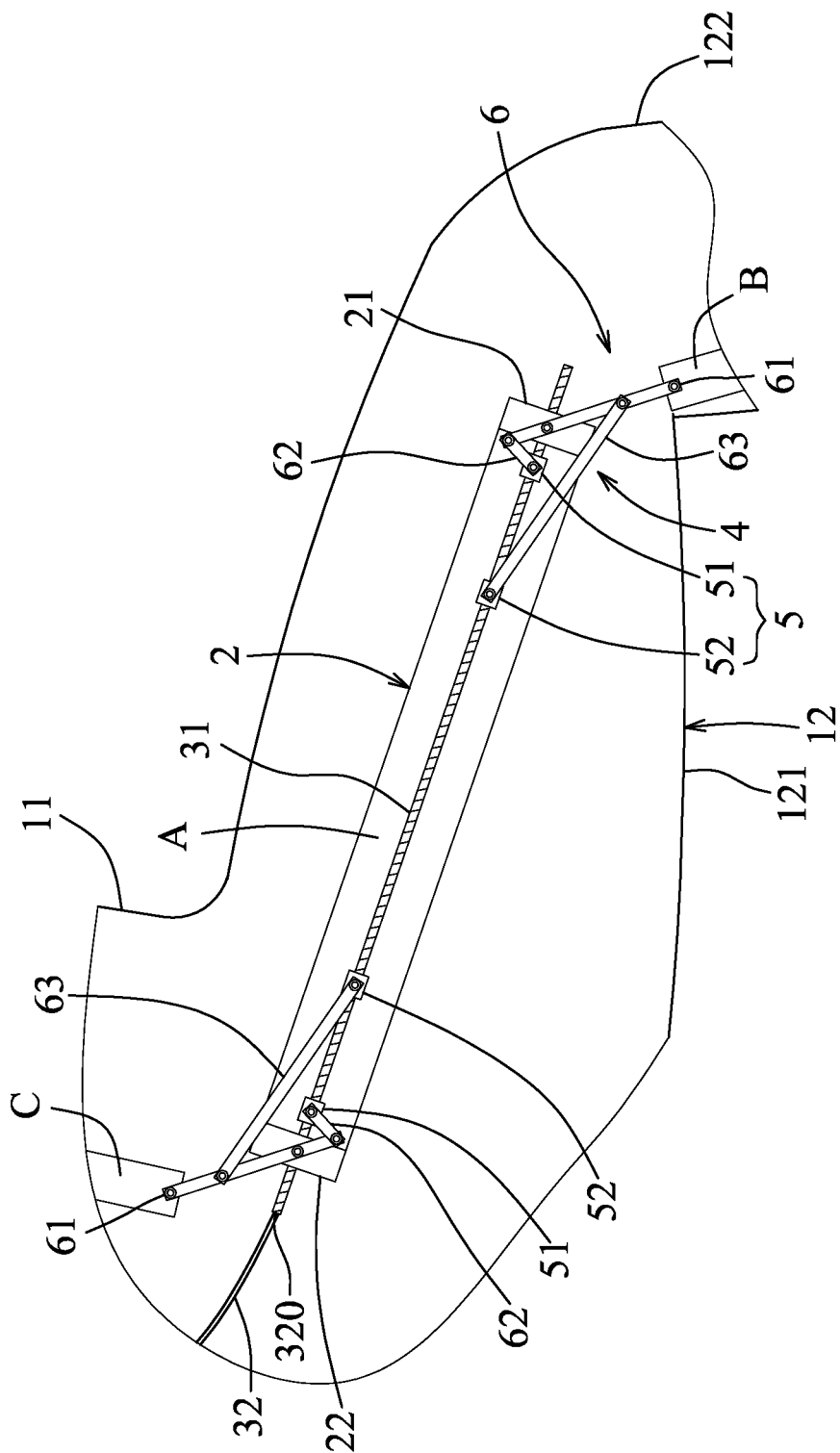
FIG. 6 is a fragmentary partly enlarged view of FIG. 5.

Further referring to FIGS. 5 and 6, by virtue of the abovementioned structures, when the second seat body (B) swings relative to the first seat body (A), the first transmission unit 6 is driven by the second seat body (B) to move between a first structural configuration (FIGS. 2 and 3) and a second structural configuration (FIGS. 5 and 6). When moving from the first structural configuration into the second structural configuration, the first transmission unit 6 exerts torques on both of the first and second driving components 51, 52 such that the cylinder 512 of the first driving component 51 rotates about the rotating shaft 31 in a first direction so as to move the first driving component 51 toward the first end 21, the cylinder 521 of the second driving component 52 is prohibited to rotate in a second direction opposite to the first direction by the ratchet sleeve 522 of the second driving component 52, and the second driving component 52 moves away from the first driving component 51, so as to drive the rotating shaft 31 to rotate in the first direction.

When the first transmission unit 6 is moving from the second structural configuration into the first structural configuration, the first transmission unit 6 exerts torques on both of the first and second driving components 51, 52, such that the cylinder 521 of the second driving component 52 rotates about the rotating shaft 31, the second driving component 52 moves toward the first end 21 of the first seat body (A) and the cylinder 511 of the first driving component 51 is prohibited to rotate in the second direction by the ratchet sleeve 512 of the first driving component 51, the first driving component 51 moves toward the second driving component 52, so as to drive the rotating shaft 31 to rotate in the first direction. In this embodiment, the first direction is clockwise direction and the second direction is counterclockwise direction. By virtue of the ratchet sleeves 512, 522, rotation of the cylinders 511, 521 in the second direction is prohibited, such that the rotating shaft 31 and the flexible shaft 32 continuously rotate in the first direction to drive the generator device 7 when the first transmission unit 6 moves between the first and second structural configurations as a result of reciprocal swinging movement of the second seat body (B) relative to the first seat body (A). In this way, the rotation direction of the rotating shaft 31 is fixed and a power loss when the rotation direction of the rotating shaft 31 is changing can be prevented, thus the efficiency of the generator device 7 is relatively good.

Note that in this embodiment, each of the first and second driving components 51, 52 further includes two C-rings 513, 523 confining the respective one of the cylinder 511, 521 of the respective one of the first and second driving components 51, 52 therebetween for preventing axial movement of the ratchet sleeve 512, 522 relative to the cylinder 511, 521 of the respective one of the first and second driving components 51, 52 along the rotating shaft 31.

The first transmission unit 6 includes an activating rod 61, an auxiliary rod 62 and an activated rod 63. The activating rod 61 has an uppermost point 614 that is disposed proximate to the first seat body (A), a lower pivot point 613 that is disposed proximate to and connected pivotally to the second seat body (B), an upper pivot point 611 that is disposed between the uppermost pivot point 614 and the lower pivot point 613 and that is connected pivotally to the first end 21 of the first seat body (A), and an intermediate pivot point 612 that is disposed between the upper pivot point 611 and the lower pivot point 613. The auxiliary rod 62 has opposite ends connected pivotally and respectively to the uppermost point 614 and the first driving component 51. The activated rod 63 has opposite ends connected pivotally and respectively to the intermediate pivot point 612 and the second driving component 52.

When the first transmission unit 6 is moved from the first structural configuration into the second structural configuration, the activating rod 61 is driven by the second seat body (B) to drive the auxiliary rod 62 to move the first driving component 51 toward the first end 21 of the first seat body (A), and the activated rod 63 is driven by the activating rod 61 to move the second driving component 52 away from the first end 21 of the first seat body (A), such that the first and second driving components 51, 52 move away from each other, so as to drive the rotating shaft 31 to rotate.

On the other hand, when the first transmission unit 6 is moved from the second structural configuration into the first structural configuration, the activating rod 61 is driven by the second seat body (B) to drive the auxiliary rod 62 to move the first driving component 51 away from the first end 21 of the first seat body (A) so as to drive the rotating shaft 31 to rotate and the activated rod 63 is driven to move the second driving component 52 toward the first end 21 of the first seat body (A) such that the first and second driving components 51, 52 move toward each other. Note that the other one of the first transmission units 6 that is connected to the third seat body (C) and the respective one of the first driving units 5 connected to the other one of the first transmission units 6 is also movable between the first and second structural configurations when the first limb portion 121 swings relative to the trunk 11 and drives the first rotating shaft device 31 to rotate in the first direction in the manner described above, and further details of the same are omitted for the sake of brevity.

Referring back to FIG. 1, the generator device 7 is connected to the first rotating shaft device 3 for converting the rotational kinetic energy into electric power. The generator device 7 includes a generator 71, a charging circuit 72 and a rechargeable battery 73. The generator 71 is driven by the second end portion 321 of the flexible shaft 32 and is configured to convert the rotational kinetic energy into electric power. The charging circuit 72 is electrically connected to the generator 71 and the rechargeable battery and is configured to charge the rechargeable battery 73 using electric power converted by the generator 71. Since the main feature of the present disclosure does not reside in the detailed structure of the generator device 7, further details of the same are omitted for the sake of brevity.

Figure 7:
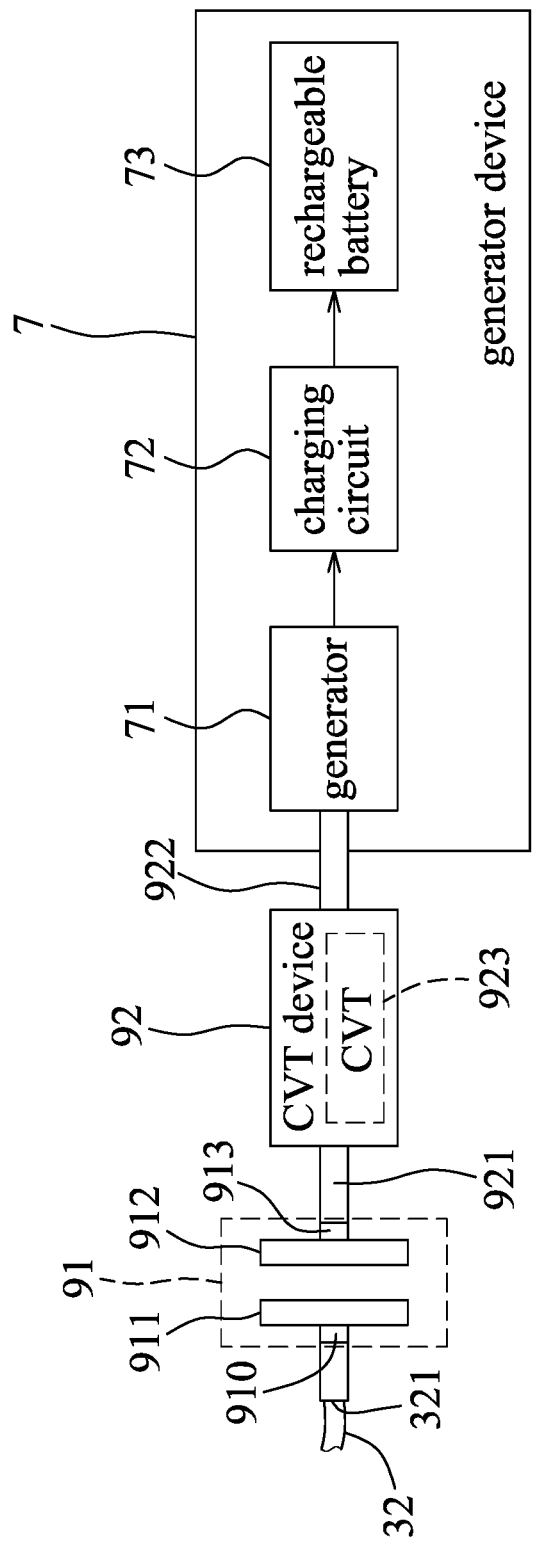
FIG. 7 is a schematic diagram of a modification of the mechanical energy harvesting system according to the first embodiment, illustrating a generator device connected to a continuously variable transmission (CVT) device and a torque limiting device of the first embodiment.

Further referring to FIG. 7, in a modification of the mechanical energy harvesting system 100, the mechanical energy harvesting system 100 further includes a torque limiting device 91 (also known as torque controller) and a continuously variable transmission (CVT) device 92 connected between the flexible shaft 32 and the generator device 7. The torque limiting device 91 is configured to transmit the rotational kinetic energy from the flexible shaft 32 to the CVT device 92 so as to drive the CVT device 92 only when a torque of the flexible shaft 32 is smaller than a predetermined threshold. In this way, the CVT device 92 would not be subjected to damage resulting from excessive torque exerted thereon. In this embodiment, the torque limiting device 91 is a permanent-magnet transmission device, which is also referred to as a permanent-magnet coupler or a permanent-magnet torque adjusting device but the present disclosure is not limited to herein. The torque limiting device 91 includes a driving rotor disk 911 and a driven rotor disk 912 that are both made of permanent-magnet. The driving rotor disk 911 includes an input terminal 910 connected to the second end portion 321 of the flexible shaft 32 and the driven rotor disk 912 includes an output terminal 913 connected to the CVT device 92. When the flexible shaft 32 is driven to rotate, the driving rotor disk 911 co-rotates thereto and drives the driven rotor disk 912 to rotate by magnetic force so as to transmit the rotational kinetic energy from the flexible shaft 32 to the CVT device 92. Once the torque of the flexible shaft 32 is larger than the magnetic attractive force between the driving rotor disk 911 and the driven rotor disk 912, the driving rotor disk 911 is not able to drive the driven rotor disk 912 to rotate. Since the feature of the present disclosure does not reside in the specific structure of the torque limiting device 91, which is well known in the art, further details of the same are omitted for the sake of brevity. It should be noted that other mechanical torque controllers for limiting output torque available on the market may be utilized in other embodiments of the present disclosure.

The CVT device 92 includes a second input shaft 921 connected to the output terminal 913 of the torque limiting device 91, a second output shaft 922 connected to the generator device 7, and a CVT 923 disposed between the second input shaft 921 and the second output shaft 922. The CVT 923 is configured to adjust a rotational speed of the second output shaft 922 according to the rotational speed of the second input shaft 921 to transmit the mechanical energy from the first rotating shaft device 3 to the generator device 7. For example, when the flexible shaft 32 starts to rotate, the CVT 923 controls the second output shaft 922 to rotate at a low rotational speed with a high torque range so as to facilitate the generator device 7 starts to rotate. After the rotational speed of the flexible shaft 32 is gradually increased, the CVT 923 controls the second output shaft 922 to rotate at a high rotational speed within a low torque range to drive the generator device 7 to operate at a relatively high speed. Note that the CVT device 92 may be any kinds of CVT devices available on the market and the present disclosure is not limited to the disclosure herein.

Figure 8:
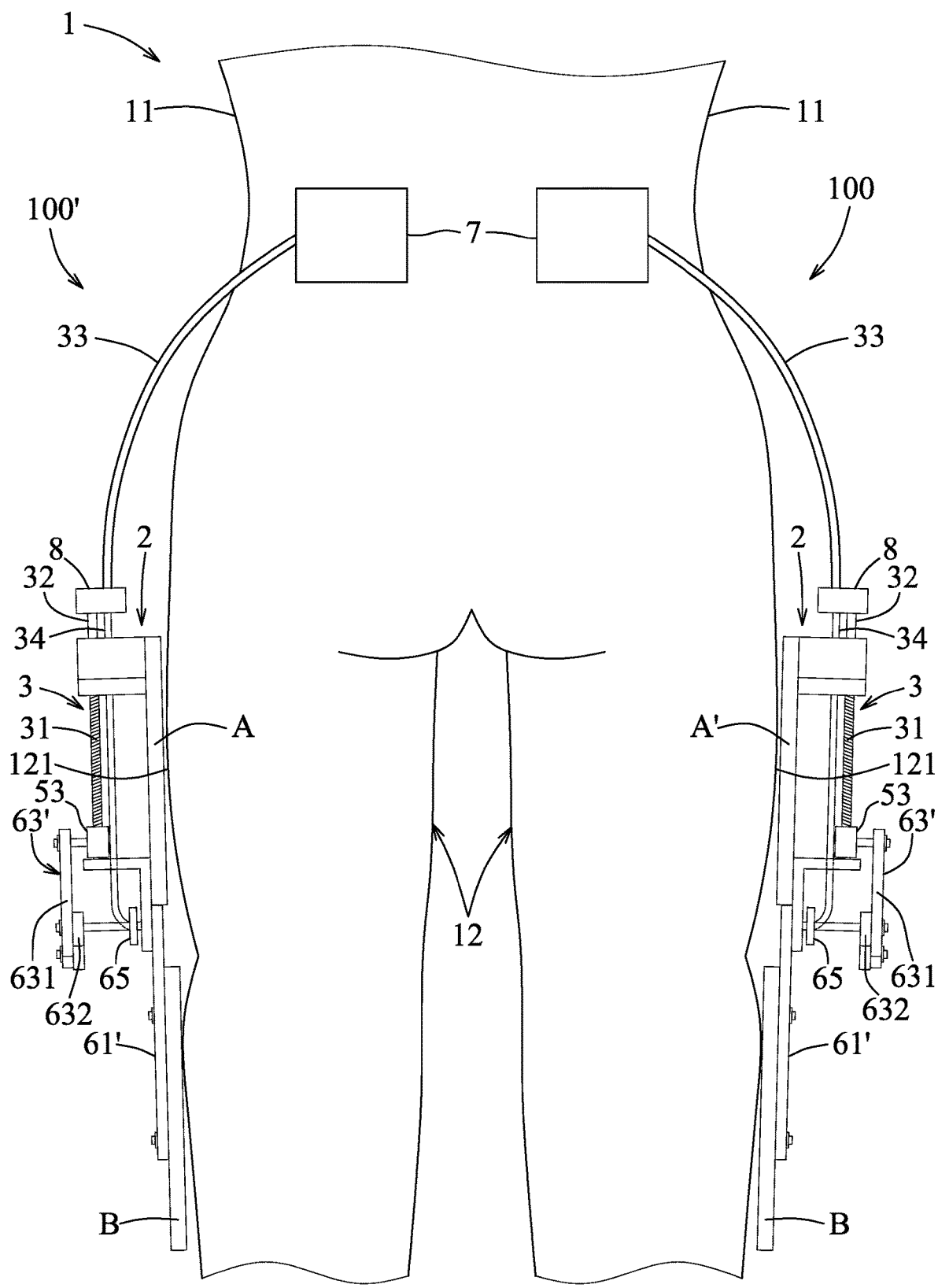
FIG. 8 is a schematic rear view of two mechanical energy harvesting systems according to a second embodiment of the present disclosure worn on a user.
Figure 9:
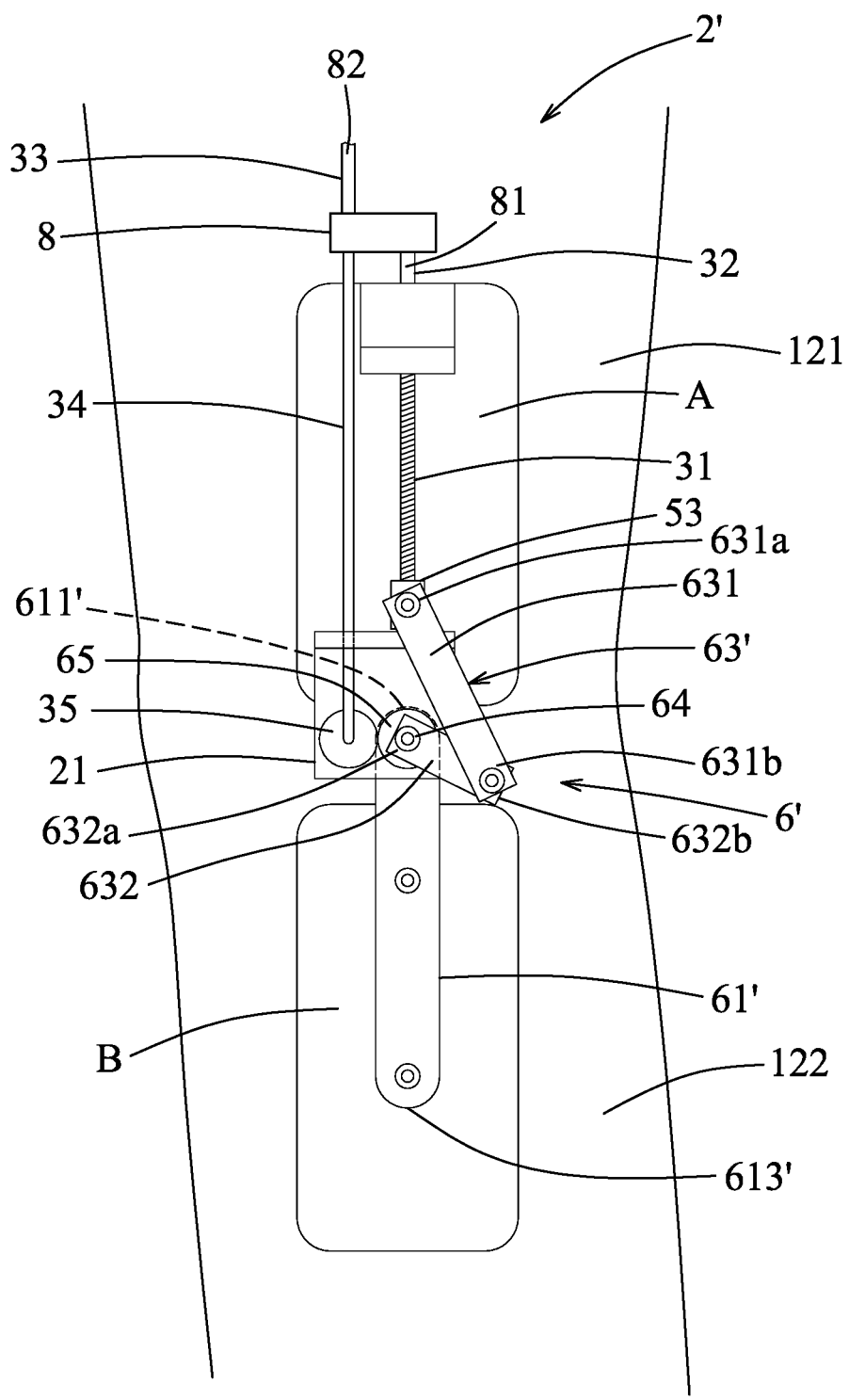
FIG. 9 is a fragmentary partly enlarged view the right one of the mechanical energy harvesting systems in FIG. 8, illustrating a transmission unit of the second embodiment being in the first structural configuration.

Referring to FIGS. 8 and 9, two mechanical energy harvesting systems 100, 100' according to a second embodiment of the present disclosure mounted respectively on the left and right lower limbs 12 of a user 1 are shown. In the second embodiment, for each mechanical energy harvesting system 100, 100', the base seat unit 2 only includes the first seat body (A) and the second seat body (B), but the third seat body (C) shown in FIG. 2 is omitted. The first and second seat bodies (A, B) are respectively mounted to the first and second limb portions 121, 122, and the second seat body (B) is reciprocally swingable relative to the first seat body (A). Note that in other embodiments, the first and second seat bodies (A, B) may be mounted respectively to the trunk 11 and the first limb portion 121. Further, the mechanical energy harvesting systems 100, 100' may be mounted on one of the left and right lower limbs 12, and the first and second seat bodies (A, B) of one of the mechanical energy harvesting systems 100, 100' are mounted respectively to the trunk 11 and the first limb portion 121, and the first and second seat bodies (A, B) of the other one of the mechanical energy harvesting systems 100, 100' are mounted respectively to the first limb portion 121 and the second limb portion 122.

Similar to the first embodiment, since the structure of the mechanical energy harvesting systems 100, 100' of the second embodiment are the same, only one of the mechanical energy harvesting systems 100, 100' with respect to the corresponding (right) one of the lower limbs 12 will be described in the following for the sake of brevity. In this embodiment, the driving device 4 includes a first driving unit 5 and a transmission unit 6 connected to the first driving unit 5. The first driving unit 5 includes a first driving component 53 pivotally connected to the transmission unit 6, sleeved on the rotating shaft 31 and formed with the internally threaded surface 50 for allowing rotation of the first driving component 53 in two directions. When the second seat body (B) swings relative to the first seat body (A), i.e., the user 1 wearing the mechanical energy harvesting system 100 is walking or running, the first transmission unit 6 is driven to move between the first structural configuration (FIG. 9) and the second structural configuration (FIG. 10), to move the first driving component 53 toward and away from the second end 22 of the first seat body (A) and to rotate the rotating shaft 31 to generate rotational kinetic energy. Note that the ratchet sleeves 512, 522 and the cylinders 511, 521 shown in FIG. 4 are omitted in this embodiment.

Figure 10:
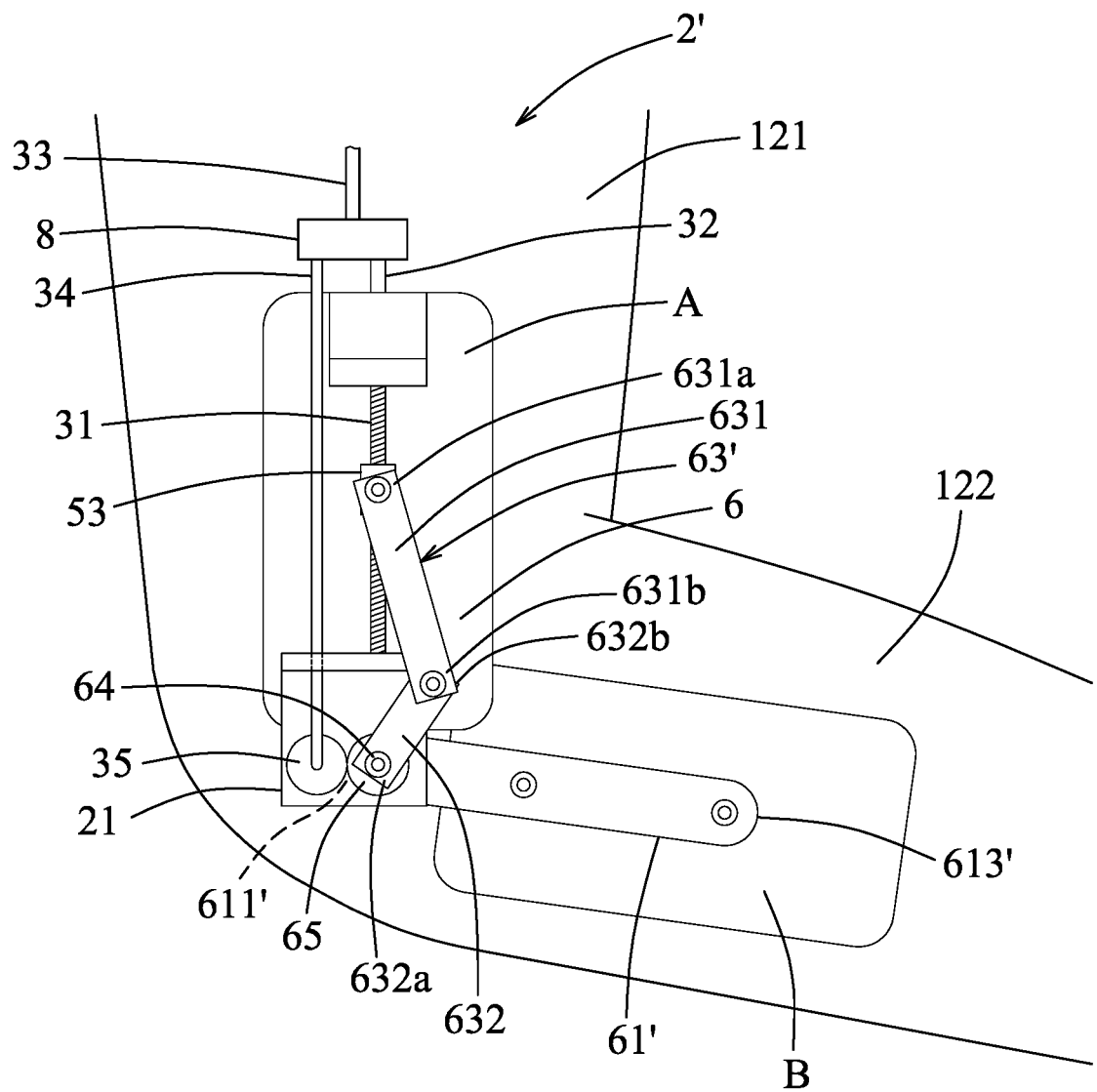
FIG. 10 is similar to FIG. 9 but illustrating the transmission unit being in the second structural configuration.

Further referring to FIG. 10, when moving from the first structural configuration into the second structural configuration, the first transmission unit 6 exerts torques on the first driving component such that the first driving component 53 moves along the rotating shaft 31 away from the second seat body (B), so as to drive the rotating shaft 31 to rotate in the first direction. On the other hand, when moving from the second structural configuration into the first structural configuration, the first transmission unit 6 exerts torques on the first driving component 53 such that the first driving component 53 moves along the rotating shaft 31 toward the second seat body (B) and thus drives the rotating shaft 31 to rotate in the second direction.

In this embodiment, the first transmission unit 6 includes an activating rod 61' and an activated rod 63', and the auxiliary rod 62 shown in FIGS. 1-3 is omitted.

The activating rod 61' has an upper pivot point 611' that is pivotally connected to the first end 21 of the first seat body (A), and a lower pivot point 613' that is pivotally connected to the second seat body (B). The activated rod 63' includes a first segment 631, a second segment 632 that are pivotally connected to the first segment 631, and a pivot joint 64. The first segment 631 has a fixing end 631*a* distal from the second segment 632 and connected fixedly to the first driving component 53, and a pivoting end 631*b* opposite to said fixing end 631*a*. The second segment 632 has a fixed end 632*a* distal from the pivoting end 631*b* of the first segment 631, and a pivot end 632*b* pivotally connected to the pivoting end 631*b* of the first segment 631 so as to allow pivot movement between the first segment 631 and the second segment 632. The pivot joint 64 extends through the fixed end 632*a* of the second segment 632, the upper pivot point 611' of the activating rod 61', and the first end 21 of the first seat body (A) so as to allow pivot movement of the second segment 632 relative to the first seat body (A) and the activating rod 61.

When the first transmission unit 6 is moved from the first structural configuration into the second structural configuration, the activating rod 61' is activated to drive the activated rod 63' to move the first driving component 53 along the rotating shaft 31 away from the second seat body (A) so as to drive the rotating shaft 31 to rotate in the first direction. When the first transmission unit 6 is moved from the second structural configuration into the first structural configuration, the activating rod 61' is activated to drive the activated rod 63' to move the first driving component 53 toward the second seat body (B) so as to drive the rotating shaft 31 to rotate in the second direction. In this way, when the user is walking or running, the second seat body (B) reciprocally swings relative to the first seat body (A) to drive the rotating shaft 31 to rotate reciprocally in the first and second directions.

Figure 11:
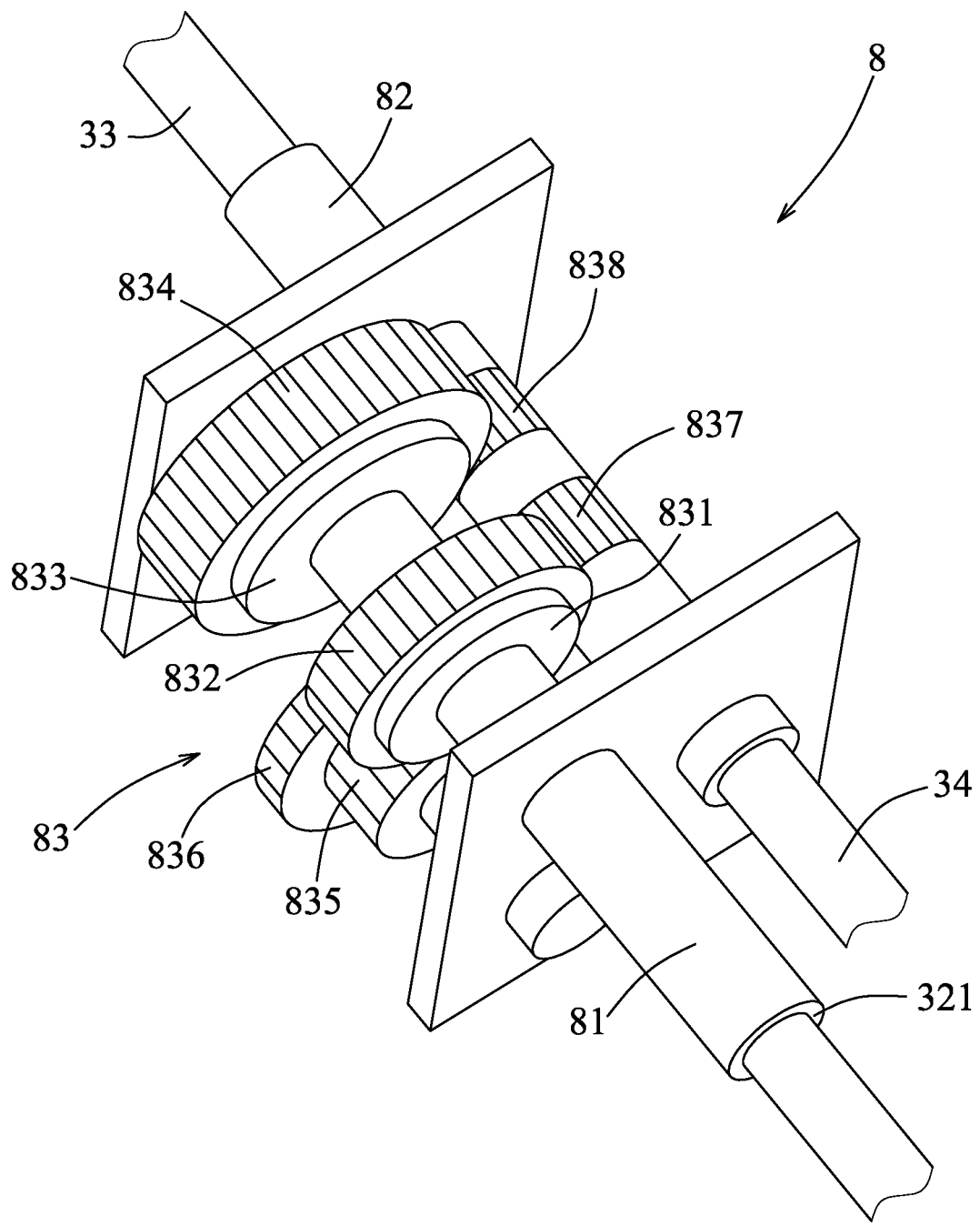
FIG. 11 is a schematic perspective view of a speed increaser of the mechanical energy harvesting system according to the second embodiment.
Figure 12:
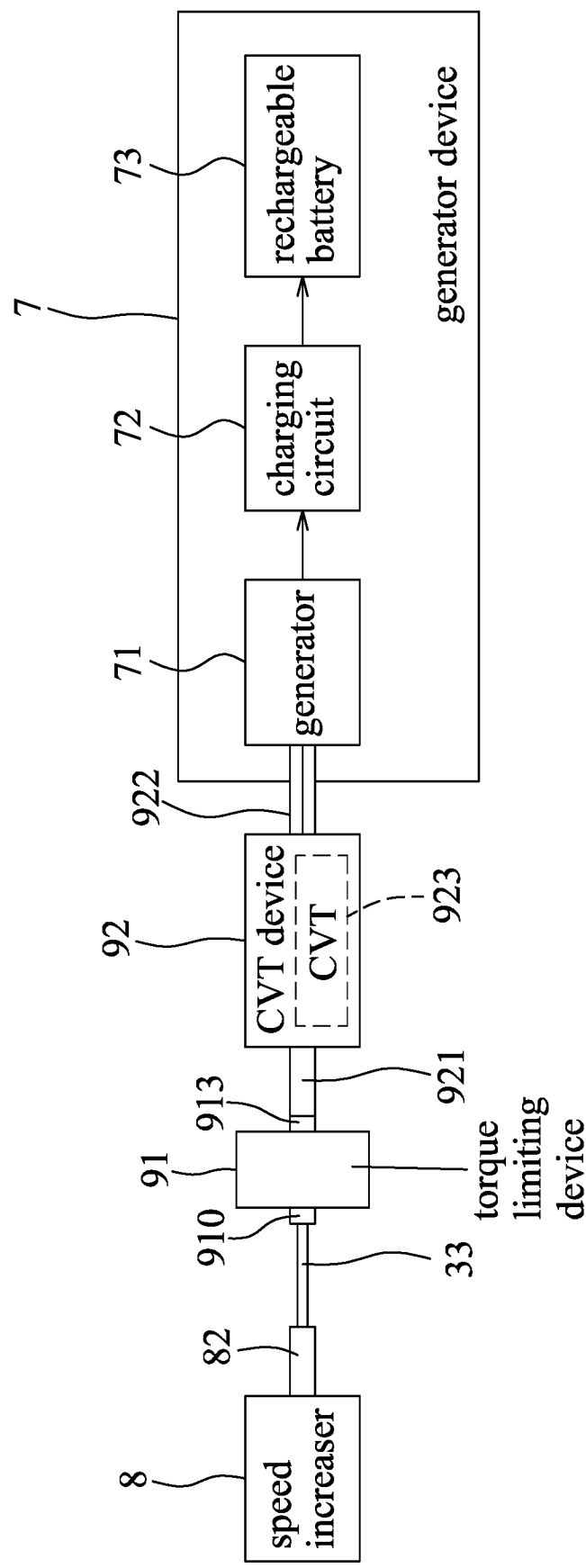
FIG. 12 is a schematic block diagram of the second embodiment, illustrating the speed increaser is connected to the generator device via the CVT device and the torque limiting device.

Further referring to FIGS. 11 and 12, in this embodiment, the mechanical energy harvesting system 100 further includes a first speed increaser 8 that is capable of increasing a rotation speed of the generator 71 and enabling the generator 71 to rotate in a single direction. Specifically, the first speed increaser 8 includes a first input shaft 81, a first output shaft 82, and a speed increasing mechanism 83. The first input shaft 81 is connected to the second end portion 321 of the flexible shaft 32. The first output shaft 82 is connected to the input terminal 910 of the torque limiting device 91. The speed increasing mechanism 83 is connected between the first input shaft 81 and the first output shaft 82 and includes a first unidirectional bearing 831, a first gear 832, a second unidirectional bearing 833, a second gear 834, a third gear 835, a fourth gear 836, a fifth gear 837 and a sixth gear 838. The first unidirectional bearing 831 is sleeved on the first input shaft 81 and is co-rotatable with the first input shaft 81 only when the first input shaft 81 rotates in the first direction. The first gear 832 is sleeved on the first unidirectional bearing 831 and co-rotates therewith and meshes with the third gear 835. The second unidirectional bearing 833 is sleeved on the first input shaft 81 and is co-rotatable with the first input shaft 81 only when the first input shaft 81 rotates in the second direction. The second gear 834 is sleeved on the second unidirectional bearing 833 and co-rotates therewith. The fourth gear 836 is co-rotatable and co-axial with the third gear 835, and has a diameter greater than that of the third gear 835. The fifth gear 837 meshes with the fourth gear 836, has a diameter smaller than that of the fourth gear 836, and is co-rotatably connected to the output shaft 82. The sixth gear 838 meshes with the second gear 834, has a diameter smaller than that of the second gear 834, and is co-rotatably connected to the output shaft 82.

When the input shaft 81 is driven by the flexible shaft 32 to rotate in the first direction, the first unidirectional bearing 831 is driven by the input shaft 81 to rotate the first gear 832 in the first direction so as to drive the third gear 835 and the fourth gear 836 to rotate in the second direction such that the fifth gear 837 and the output shaft 82 are driven by the fourth gear 836 to rotate in the first direction.

When the input shaft 81 is driven by the flexible shaft 32 to rotate in the second direction, the second unidirectional bearing 833 is driven by the input shaft 81 to drive the second gear 834 to rotate in the second direction so as to drive the sixth gear 838 and the output shaft 82 to rotate in the first direction.

In this embodiment, a ratio of the diameter of the fourth gear 836 relative to the fifth gear 837 is 5:1 and a ratio of the diameter of the second gear 834 relative to the sixth gear 838 is 5:1. In this way, the speed increasing mechanism 83 is capable of increasing a rotation speed of the first output shaft 82 when transmitting the rotational kinetic energy from the flexible shaft 32 and enabling the first output shaft 82 to continuously rotate in a single direction regardless of the rotation direction of the rotating shaft 31. Subsequently, the torque limiting device 91 and the CVT device 92 transmit the rotational kinetic energy from the first speed increaser 8 to the generator device 7. It should be noted that the ratio of diameter of the fourth gear 836 relative to the fifth gear 837, and the second gear 834 relative to the sixth gear 838 can be modified according to user demand and the present disclosure is not limited to the example described herein.

In this embodiment, the first rotating shaft device 3 further includes a transmission flexible shaft 33, an auxiliary flexible shaft 34 and a shaft gear 35, and the first transmission unit 6 further includes a pivot gear 65. Specifically, the transmission flexible shaft 33 is connected between the first output shaft 82 of the first speed increaser 8 and the generator device 7 for transmitting the rotational kinetic energy from the flexible shaft 32 to the generator device 7. The auxiliary flexible shaft 34 is connected co-rotatably to one end of said first output shaft 82 of the first speed increaser 8 that is opposite to the generator device 7. The shaft gear 35 is sleeved on and connected co-rotatably to the auxiliary flexible shaft 34. The pivot gear 65 is sleeved on and connected co-rotatably to the pivot joint 64, meshes with the shaft gear 35 and is driven by the shaft gear 35 to rotate. By virtue of the abovementioned structures, when the first output shaft 82 is driven to rotate, the rotational kinetic energy is transmitted to the auxiliary flexible shaft 34 to drive rotation of the auxiliary flexible shaft 34 and thus the shaft gear 35 to thereby drive the pivot gear 65 and the pivot joint 64 to rotate, so as to drive pivot movement of the second segment 632 relative to the pivot joint 64 is facilitated. In this way, the user can exert less force to conduct reciprocal swinging movement of the second seat body (B) relative to the first seat body (A).

In a modification of the second embodiment, the torque limiting device 91 and the CVT device 92 shown in FIG. 12 can be omitted and the first output shaft of the first speed increaser 8 is connected directly to the generator device 7.

Figure 13:
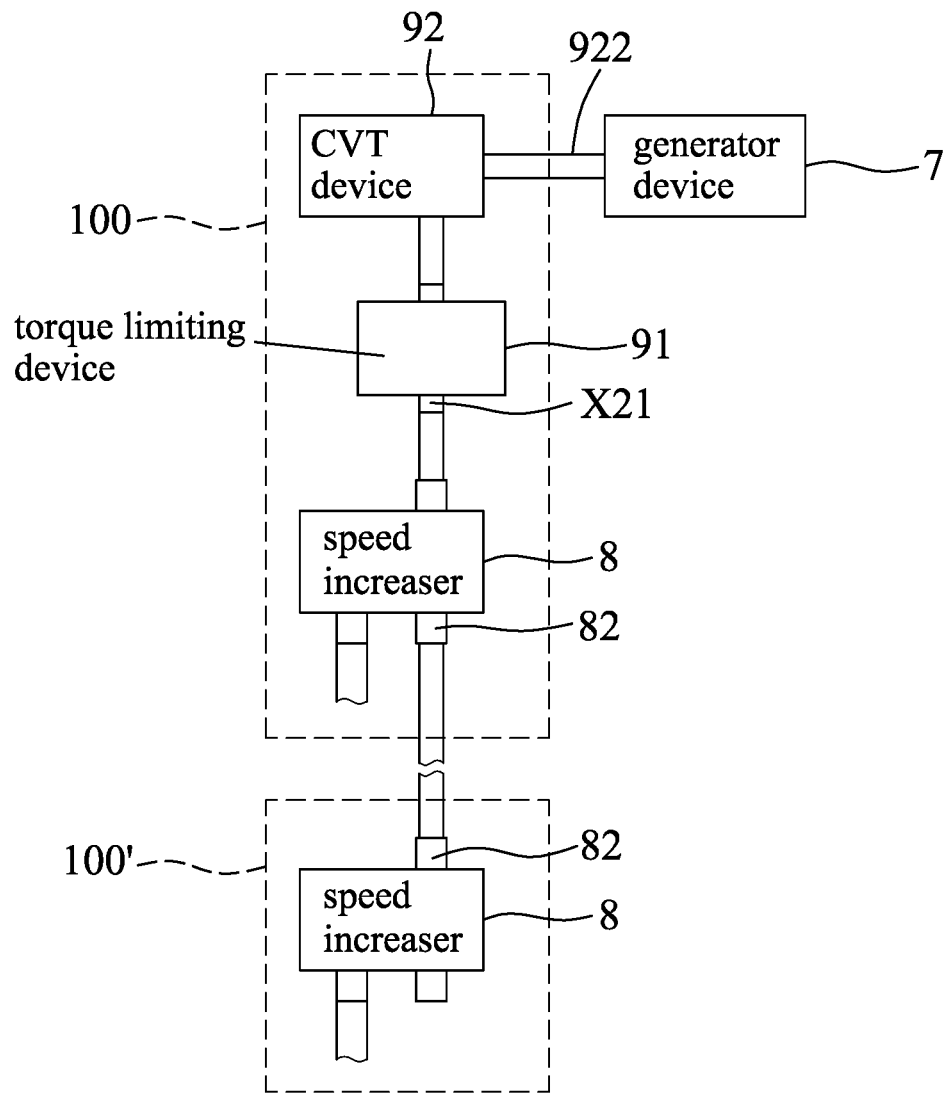
FIG. 13 is a schematic diagram illustrating two mechanical energy harvesting systems of the first embodiment sharing one generator device.

Referring to FIG. 13, in the case that modified first and second mechanical energy harvesting systems 100, 100' shown in FIG. 8 share one generator device 7, the second output shaft 922 of the CVT device 92 of a first mechanical energy harvesting system 100 is connected to the generator device 7.

The first output shaft 82 of the first speed increaser 8 of the second mechanical energy harvesting system 100' is connected to the first output shaft 82 of the first speed increaser 8 of the first mechanical energy harvesting system 100 to combine the rotational kinetic energy from the first and second mechanical energy harvesting systems 100, 100' in series. Then, the combined rotational kinetic energy is transmitted from the second output shaft 922 of the CVT device 92 of the first mechanical energy harvesting system 100 to the generator device 7 for subsequent conversion. In the abovementioned configuration, the torque limiting device 91 and the CVT device 92 of the second mechanical energy harvesting system 100' may be omitted. Note that the two mechanical energy harvesting systems 100, 100' can be connected in other manners as long as the rotational kinetic energy respectively generated thereby can be transmitted to the same generator device 7 and the present disclosure is not limited to the disclosure herein.

Figure 14:
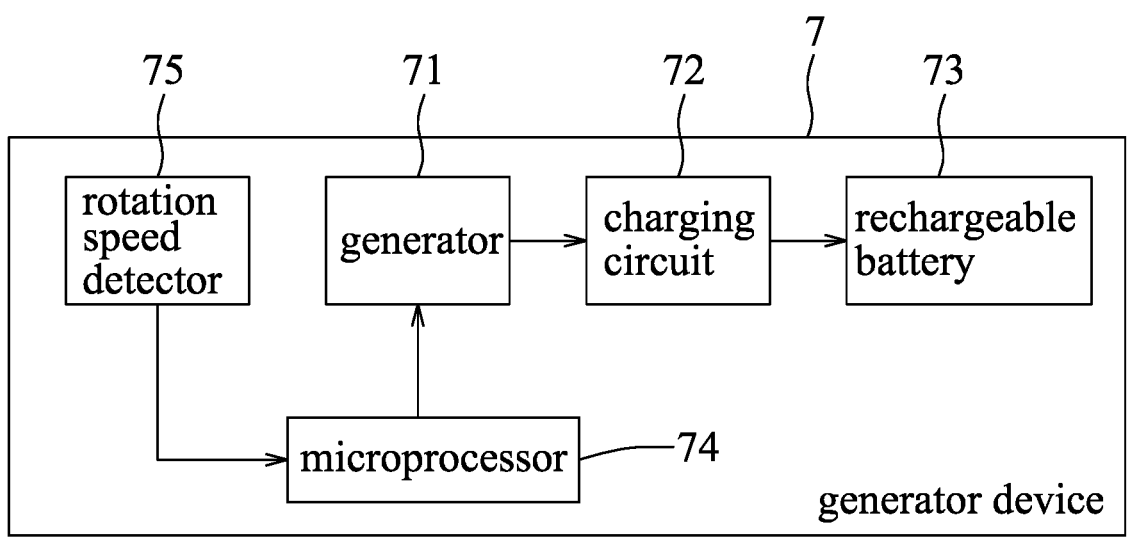
FIG. 14 is a block diagram illustrating a modified generator device to be utilized by the mechanical energy harvesting system according to the first and second embodiments.

Referring to FIG. 14, a modified generator device that can be utilized in the first and second embodiment of the present disclosure is shown. The modified generator device 7 further includes a rotation speed detector 75, and a microprocessor 74 electrically connected to the generator 71 and the rotation speed detector 75. The rotation speed detector 75 is configured to detect a rotation speed of the generator 71 and output a rotation speed signal representing a rotation speed of the generator 71 to the microprocessor 74. The microprocessor 74 is configured to output a control signal for controlling the generator 71 to operate until the rotational speed of the generator 71 is greater than the predetermined threshold. That is to say, when the rotational speed of the generator 71 is smaller than the predetermined threshold, e.g. 500 revolutions per minute (rpm), the microprocessor 74 controls the generator 71 to increase its rotational speed until the rotational speed of the generator 71 is greater than or equal to the predetermined threshold. Then, the microprocessor 74 stops to output the control signal for controlling the generator 71 to operate. In this way, the rotational speed of the generator 71 is increased to be greater than or equal to the predetermined threshold, which is beneficial to the efficiency of subsequent conversion of the kinetic energy into electricity.

Additionally, the microprocessor 74 is further configured to collect, record and analyze the rotational speed of the generator 71 according to the rotation speed signal outputted by the rotation speed detector 75 and to output an analyzed result, using wireless transmission techniques such as Bluetooth, to an electronic mobile device, e.g., a smart phone or a tablet computer, possessed by the user and to be displayed on a display of the electronic mobile device.

Figure 15:
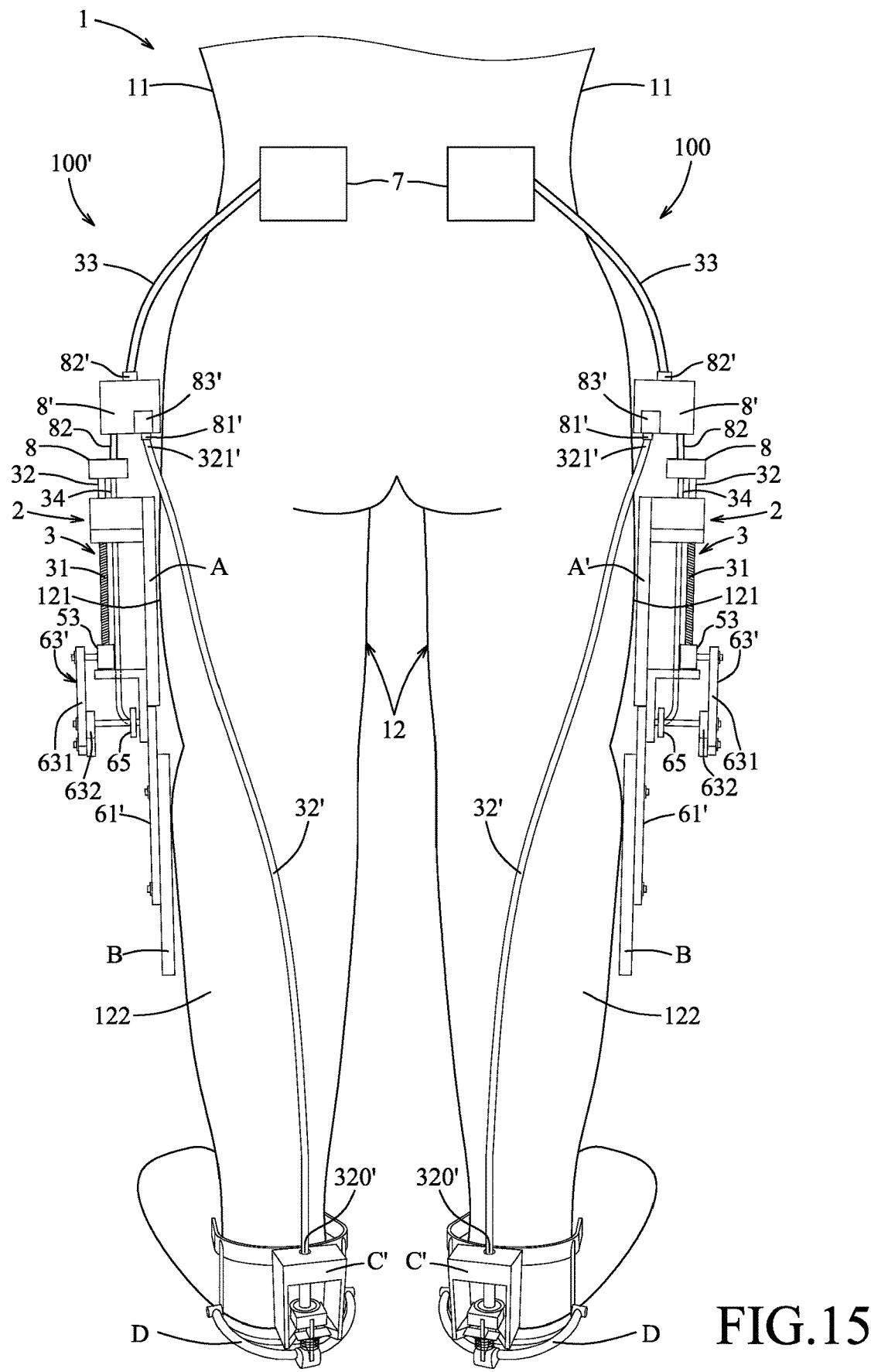
FIG. 15 is a schematic rear view of two mechanical energy harvesting systems according to a third embodiment of the present disclosure worn on a user.
Figure 16:
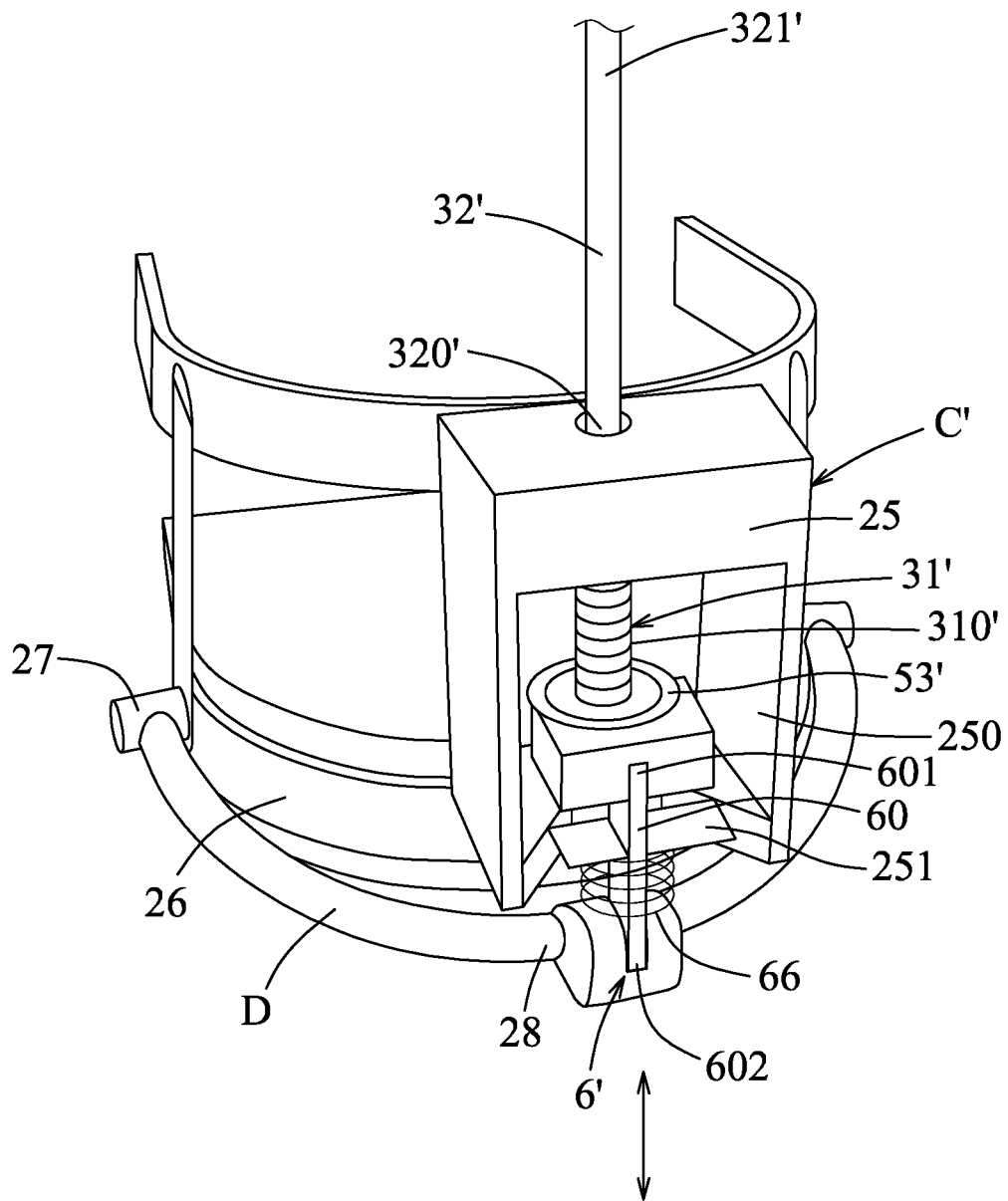
FIG. 16 is a schematic side view of the one of the mechanical energy harvesting system according to the third embodiment, illustrating a second transmission unit of the third embodiment being in a first structural configuration.
Figure 17:
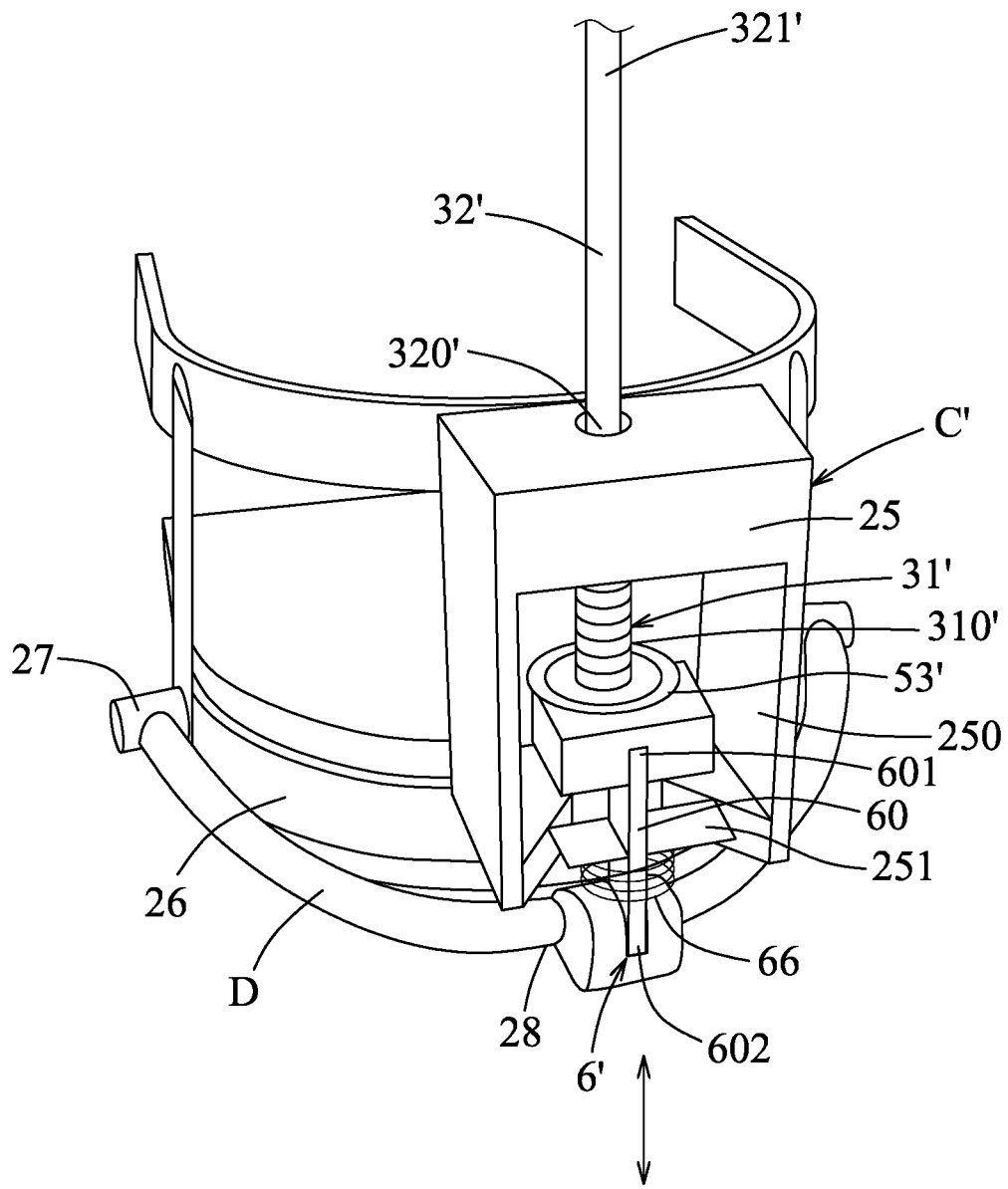
FIG. 17 is similar to FIG. 16 but illustrating the second transmission unit being in a second structural configuration.

Referring to FIGS. 15 and 16, two mechanical energy harvesting systems 100, 100' according to a third embodiment of the present disclosure mounted respectively on the left and right lower limbs 12 of a user 1 are shown. The third embodiment is similar to the second embodiment, but the differences between the third embodiment and the second embodiment reside in the following.

In the third embodiment, each of the mechanical energy harvesting system 100, 100' further includes a second rotating shaft device 3' and a second speed increaser 8', and the base seat unit 2 of each of the mechanical energy harvesting system 100, 100' further includes a third seat body (C') and a fourth seat body (D). For each mechanical energy harvesting system 100, 100', the third and fourth seat bodies (C', D) thereof are respectively mounted to a part of the second limb portion 122 adjacent to the ankle joint and the heel, and the fourth seat body (D) is reciprocally swingable relative to the third seat body (C') when the user is walking or running. In this embodiment, the third seat body (C') of each of the mechanical energy harvesting systems 100, 100' is mounted to a heel counter of a shoe worn by the user 1 and the fourth seat body (D) is mounted to an outer sole of the shoe at a heel portion.

Similar to the second embodiment, since the structures of the mechanical energy harvesting systems 100, 100' of the third embodiment are the same, only one of the mechanical energy harvesting systems 100, 100' with respect to the corresponding (right) one of the lower limbs 12 will be described in the following for the sake of brevity.

The second rotating shaft device 3' includes a second rotating shaft 31' having an externally threaded outer surface 310', and a flexible shaft 32' having first and second end portions 320', 321' that are connected respectively to the second rotating shaft 31' and the generator device 7, and driven to rotate by the second rotating shaft 31' for transmitting the rotational kinetic energy to the generator device 7.

In this embodiment, the driving device 4 further includes a second driving unit 5' and a second transmission unit 6' connected between the fourth seat body (D) and the second driving unit 5'. The second transmission unit 6' is configured to drive the second rotating shaft device 3' to rotate when the fourth seat body (D) swings relative to the third seat body (C'), so as to generate the rotational kinetic energy.

The second driving unit 5' includes a second driving component 53' connected to the second transmission unit 6', sleeved on the second rotating shaft 31' and formed with an internally threaded surface 50' threadedly engaging the externally threaded outer surface 310' for allowing rotation of the second driving component 53' in two directions such that, when the fourth seat body (D) swings relative to the third seat body (C'), the second transmission unit 6' is driven to move between a first structural configuration and a second structural configuration.

Specifically, as shown in FIG. 16, the second transmission unit 6' includes a biasing member 66 and a pushing rod 60. The pushing rod 60 has an upper end 601 that is connected fixedly to the second driving component 53', and a lower pivot point 602 that is connected pivotally to the fourth seat body (D) so as to allow pivot movement of the pushing rod 60 relative to the fourth seat body (D). The biasing member 66 is sleeved on the second rotating shaft 31', has two opposite ends connected respectively to the third seat body (C') and the fourth seat body (D), and is configured to bias the fourth seat body (D) away from the third seat body (D). In this embodiment, the biasing member 66 is a compression spring.

In this embodiment, the third seat body (C') includes a main body 25 on which the second rotating shaft device 3' is rotatably mounted and a mounting portion 26 having an arc shape configuration. The main body 25 defines a receiving space 250 for receiving the second rotating shaft 31', the second driving component 53', a portion of the flexible shaft 32' and a portion of the the second transmission unit 6' therein, and includes a plate 251 formed with a through hole allowing the pushing rod 60 to extend therethrough for guiding movement of the pushing rod 60 when the second transmission unit 6' moves between the first structural configuration and the second structural configuration.

The fourth seat body (D) has a semicircular shape configuration, is disposed around the mounting portion 26 of the third seat body (C'), and includes a hinge portion 27 and a pivoting portion 28 respectively and pivotally connected to the mounting portion 26 of the third seat body (C') and the lower pivot point 602 of the pushing rod 60 so as to allow pivot movement between the main body 26 and the fourth seat body (D), and between the fourth seat body (D) and the pushing rod 60. The opposite ends of the biasing member 66 abut respectively against the guiding plate 251 of the third seat body (D) and the pivoting portion 28 of the fourth seat body (D).

When the second transmission unit 6' moves from the first structural configuration into the second structural configuration, i.e., the user 1 steps on the ground, the pushing rod 60 of the second transmission unit 6' is activated to exerts torques on the second driving component 53' such that the second driving component 53' moves along the second rotating shaft 31' away from the fourth body seat (D) and thus drives the second rotating shaft 31' to rotate in the first direction.

On the other hand, when the second transmission unit 6' moves from the second structural configuration into the first structural configuration, i.e., the user 1 lifts the heels from the ground, the pushing rod 60 is activated by a restoring force provided by the biasing member 66 to exert torques on the second driving component 53' such that the second driving component 53' moves along the second rotating shaft 31' toward the fourth seat body (D) and thus drives the second rotating shaft 31' to rotate in the second direction. The biasing member 66 facilitates the second transmission unit 6' to move from the second structural configuration to the first structural configuration.

Referring back to FIG. 15, the second speed increaser 8' includes a first input shaft 81' connected to the second end portion 321' of the flexible shaft 32', a first output shaft 82' connected to the generator device 7, and a speed increasing mechanism 83' connected between the first input shaft 81' and the first output shaft 82', and configured to increase a rotation speed of the first output shaft 82' when transmitting the rotational kinetic energy from the flexible shaft 32' and enable the first output shaft 82' to rotate in a single direction. The speed increasing mechanism 83' may have the same structure as the speed increasing mechanism 83 shown in FIG. 11, Note that the first output shaft 82 of the first speed increaser 8 may be connected to the first output shaft 82' of the second speed increaser 8' to combine the rotational kinetic energy from the first rotating shaft device 3 and the second rotating shaft device 3' in series. Then, the combined rotational kinetic energy is transmitted to the generator device 7 for subsequent conversion through the transmission flexible shaft 33.

To sum up, the mechanical energy harvesting system of the present disclosure is adapted to be worn on the user 1 to generate rotational kinetic energy by the driving device 4 when the user is walking or running, then the generator device 7 converts the rotational kinetic energy into electric power to be stored in the rechargeable battery 73. In this way, the rechargeable battery 73 serves as a portable battery charger for the electronic mobile device possessed by the user.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A mechanical energy harvesting system adapted to be worn on a user having a trunk, a first limb portion swingable relative to the trunk, and a second limb portion swingable relative to the first limb portion, said mechanical energy harvesting system comprising
a base seat unit including
a first seat body adapted to be mounted on one of the trunk, the first limb portion and the second limb portion, and
a second seat body reciprocally swingable relative to said first seat body, and adapted to be mounted on one of the trunk and the second limb portion when said first seat body is mounted on the first limb portion, and to be mounted to the first limb portion when said first seat body is mounted on one of the trunk and the second limb portion;
a rotating shaft device rotatably mounted to said first seat body;
a driving device disposed on said base seat unit and including
at least one driving unit sleeved on said rotating shaft device for driving said rotating shaft device to rotate, and
at least one transmission unit connected between said second seat body and said driving unit and configured to exert torque on said driving unit which drives said rotating shaft device to rotate when said second seat body swings relative to said first seat body, so as to permit said driving unit to generate rotational kinetic energy from relative movement between said first seat body and said second seat body; and
a generator device connected to said rotating shaft device for converting the rotational kinetic energy into electric power,
wherein:
said rotating shaft device includes a rotating shaft having an externally threaded outer surface;
said driving unit has an internally threaded surface threadedly engaging said externally threaded outer surface;
said first seat body has a first end and a second end opposite to each other along said rotating shaft,
said rotating shaft extends through said first end and said second end; and
said second seat body is disposed adjacent to said first end of said first seat body and activates said transmission unit to move said driving unit toward and away from said second end along said rotating shaft to rotate said rotating shaft when said second seat body swings relative to said first seat body.

2. The mechanical energy harvesting system as claimed in claim 1, wherein said driving unit includes first and second driving components connected to said transmission unit and sleeved on said rotating shaft,
said first driving component being adjacent to one of said first and second ends,
said second driving component being opposite to said first driving component along said rotating shaft,
each of said first and second driving components including a cylinder that is formed with said internally threaded surface, and
a ratchet sleeve that is sleeved on said cylinder of the respective one of said first and second driving components, said ratchet sleeve being formed with an internal ratchet for allowing rotation of said cylinder in a single direction such that when said second seat body swings relative to said first seat body, said transmission unit is driven by said second seat body to move between a first structural configuration and a second structural configuration so that:
when moving from the first structural configuration to the second structural configuration,
said transmission unit exerts torques on both of said first and second driving components such that said cylinder of said first driving component rotates about said rotating shaft in a first direction so as to move said first driving component toward said one of said first and second ends,
said cylinder of said second driving component is prohibited to rotate in a second direction opposite to the first direction by said ratchet sleeve of said second driving component, and said second driving component moves away from said first driving component, so as to drive said rotating shaft to rotate in the first direction and
when moving from the second structural configuration to the first state structural configuration,
said transmission unit exerts torques on both of said first and second driving components, such that said cylinder of said second driving component rotates about said rotating shaft in the second direction, and
said second driving component moves toward said one of said first and second ends and said cylinder of said first driving component is prohibited to rotate in the second direction by said ratchet sleeve of said first driving component, so that said first driving component moves toward said second driving component and thus drives said rotating shaft to rotate in the first direction.

3. The mechanical energy harvesting system as claimed in claim 2, wherein said transmission unit includes an activating rod, an auxiliary rod and an activated rod,
said activating rod having
an uppermost point that is disposed proximate to said first seat body,
a lower pivot point that is connected pivotally to said second seat body,
an upper pivot point that is disposed between said uppermost pivot point and said lower pivot point and that is connected pivotally to said first end of said first seat body, and
an intermediate pivot point that is disposed between said upper pivot point and said lower pivot point,
said auxiliary rod having opposite ends connected pivotally and respectively to said uppermost point and said first driving component,
said activated rod having opposite ends connected pivotally and respectively to said intermediate pivot point and said second driving component,
when said transmission unit is moved from the first structural configuration into the second structural configuration, said activating rod is driven by said second seat body to drive said auxiliary rod to move said first driving component toward said first end of said first seat body, and said activated rod is driven by said activating rod to move said second driving component away from said first end of said first seat body, such that said first and second driving components move away from each other, so as to drive said rotating shaft to rotate, and when said transmission unit is moved from the second structural configuration into the first structural configuration, said activating rod is driven by said second seat body to drive said auxiliary rod to move said first driving component away from said first end of said first seat body so as to drive said rotating shaft to rotate, and said activated rod is driven to move said second driving component toward said first end of said first seat body such that said first and second driving components move toward each other.

4. The mechanical energy harvesting system as claimed in claim 3, wherein said rotating shaft device further includes a flexible shaft having first and second end portions connected respectively to said rotating shaft and said generator device for transmitting the rotational kinetic energy to said generator device.

5. The mechanical energy harvesting system as claimed in claim 4, further comprising:
   a torque limiting device that includes an input terminal connected to said second end portion of said flexible shaft and an output terminal; and
   a continuously variable transmission (CVT) device that includes
      a second input shaft connected to said output terminal of said torque limiting device,
      a second output shaft connected to said generator device, and
      a CVT disposed between said second input shaft and said second output shaft,
   said torque limiting device being configured to transmit the rotational kinetic energy from said flexible shaft to said CVT device so as to drive said CVT device only when a torque of said flexible shaft is smaller than a predetermined threshold;
   said CVT being configured to adjust a rotational speed of said second output shaft according to the rotational speed of said second input shaft to transmit the rotational kinetic energy from said rotating shaft to said generator device.

6. The mechanical energy harvesting system as claimed in claim 4, wherein said generator device includes
   a generator rotatable by said second end portion of said flexible shaft,
   a rotation speed detector, and
   a microprocessor electrically connected to said generator and said rotation speed detector,
   said rotation speed detector being configured to detect a rotation speed of said generator and output a rotation speed signal representing a rotation speed of said generator to said microprocessor,
   said microprocessor being configured to output a control signal for controlling said generator to operate until the rotational speed of said generator is greater than a predetermined threshold.

7. The mechanical energy harvesting system as claimed in claim 2, wherein said driving device includes:
   two of said driving units sleeved on said rotating shaft respectively adjacent to said first and second ends of said first seat body; and
   two of said transmission units respectively connected to said driving units.

8. The mechanical energy harvesting system as claimed in claim 3, wherein said driving unit includes a driving component pivotally connected to said transmission unit, said driving component being sleeved on said rotating shaft, said driving component being formed with said internally threaded surface for allowing rotation of said driving component in two directions such that,
   when said second seat body swings relative to said first seat body, said transmission unit is driven to move between a first structural configuration and a second structural configuration;
   when moving from the first structural configuration into the second structural configuration, said transmission unit exerts torques on said driving component such that said driving component moves along said rotating shaft away from said second seat body and thus drives said rotating shaft to rotate in a first direction;
   when moving from the second structural configuration into the first structural configuration, said transmission unit exerts torques on said driving component such that said driving component moves along said rotating shaft toward said second seat body and thus drives said rotating shaft to rotate in a second direction opposite to the first direction;
   said transmission unit includes
   an activating rod having an upper pivot point that is pivotally connected to said first end of said first seat body, a lower pivot point that is pivotally connected to said second seat body, and
   an activated rod including
      a first segment that has a fixing end connected fixedly to said driving component and a pivoting end opposite to said fixing end,
      a second segment that has a fixed end distal from said pivoting end of said first segment and a pivot end pivotally connected to said pivoting end of said first segment so as to allow pivot movement between said first segment and said second segment, and
      a pivot joint that extends through said fixed end of said second segment, said upper pivot point of said activating rod and said first end of said first seat body so as to allow pivot movement of said second segment relative to said first seat body and said activating rod,
   when said transmission unit is moved from the first structural configuration into the second structural configuration, said activating rod is activated to drive said activated rod to move said driving component along said rotating shaft away from said second seat body so as to drive said rotating shaft to rotate in the first direction;
   when said transmission unit is converted moved from the second structural configuration into the first structural configuration, said activating rod is activated to drive said activated rod to move said driving component toward said second seat body so as to drive said rotating shaft to rotate in the second direction opposite to said first direction.

9. The mechanical energy harvesting system as claimed in claim 8, wherein said rotating shaft device further includes a flexible shaft having first and second end portions that are connected respectively to said rotating shaft and said generator device, and being driven to rotate by said rotating shaft for transmitting the rotational kinetic energy to said generator device.

10. The mechanical energy harvesting system as claimed in claim 9, wherein said generator device includes
   a generator driven by said second end portion of said flexible shaft,
   a rotation speed detector, and a microprocessor electrically connected to said generator and said rotation speed detector, said rotation speed detector being configured to detect a rotation speed of said generator and output a rotation speed signal representing a rotation speed of said generator to said microprocessor, said microprocessor being configured to output a control signal for controlling said generator to operate until the rotational speed of said generator is greater than a predetermined threshold.

11. The mechanical energy harvesting system as claimed in claim 9, further comprising a speed increaser that includes a first input shaft connected to said second end portion of said flexible shaft, a first output shaft connected to said generator device, and a speed increasing mechanism connected between said first input shaft and said first output shaft, configured to increase a rotation speed of said first output shaft when transmitting the rotational kinetic energy from said flexible shaft and enable said first output shaft to rotate in a single direction.

12. The mechanical energy harvesting system as claimed in claim 11, further comprising:

a second rotating shaft device including a second rotating shaft having an externally threaded outer surface, and a flexible shaft having first and second end portions connected respectively to said second rotating shaft and said generator device, and driven to rotate by said second rotating shaft for transmitting the rotational kinetic energy to said generator device; and a second speed increaser including a first input shaft connected to said second end portion of said flexible shaft, a first output shaft connected to said generator device, and a speed increasing mechanism connected between said first input shaft and said first output shaft, configured to increase a rotation speed of said first output shaft when transmitting the rotational kinetic energy from said flexible shaft and enable said first output shaft to rotate in a single direction;

said base seat unit further including a third seat body and a fourth seat body reciprocally swingable relative to said third seat body, said second rotating shaft device being rotatably mounted to said third seat body, said driving device including a second driving unit, and a second transmission unit connected between said fourth seat body and said second driving unit, and configured to drive said second rotating shaft device to rotate when said fourth seat body swings relative to said third seat body, so as to generate the rotational kinetic energy, said second driving unit including a second driving component connected to said second transmission unit, sleeved on said second rotating shaft and formed with an internally threaded surface threadedly engaging said externally threaded outer surface for allowing rotation of said second driving component in two directions such that, when said fourth seat body swings relative to said third seat body, said second transmission unit is driven to move between a first structural configuration and a second structural configuration;

when moving from the first structural configuration into the second structural configuration, said second transmission unit exerts torques on said second driving component such that said second driving component moves along said second rotating shaft away from said fourth body seat and thus drives said second rotating shaft to rotate in a first direction;

when moving from the second structural configuration into the first structural configuration, said second transmission unit exerts torques on said second driving component such that said second driving component moves along said second rotating shaft toward said fourth seat body and thus drives said second rotating shaft to rotate in a second direction opposite to the first direction;

said second transmission unit including a pushing rod having an upper end that is connected fixedly to said second driving component, and a lower pivot point that is pivotally connected to said fourth seat body so as to allow pivot movement of said pushing rod relative to said fourth seat body, when said second transmission unit is moved from the first structural configuration into the second structural configuration, said pushing rod is activated to move said second driving component along said second rotating shaft away from said fourth seat body so as to drive said second rotating shaft to rotate in a first direction; and when said transmission unit is moved from the second structural configuration into the first structural configuration, said pushing rod is activated to move said second driving component toward said fourth seat body so as to drive said second rotating shaft to rotate in a second direction opposite to said first direction.

13. The mechanical energy harvesting system as claimed in claim 12, wherein said second transmission unit further includes a biasing member sleeved on said second rotating shaft, having two opposite ends abutting respectively against said third seat body and said fourth seat body, and configured to bias said fourth seat body away from said third seat body.

14. The mechanical energy harvesting system as claimed in claim 13, wherein said third seat body includes a main body on which said second rotating shaft device is rotatably mounted, and a mounting portion having an arc shape configuration, said fourth seat body including a hinge portion, and a pivoting portion respectively and pivotally connected to said mounting portion of said third seat body and said lower pivot point of said pushing rod so as to allow pivot movement between said main body and said fourth seat body, and between said fourth seat body and said pushing rod.

15. The mechanical energy harvesting system as claimed in claim 11, wherein said rotating shaft device further includes a transmission flexible shaft connected between said first output shaft of said speed increaser and said generator device for transmitting the rotational kinetic energy to said generator device.

16. The mechanical energy harvesting system as claimed in claim 11, wherein said rotating shaft device further includes an auxiliary flexible shaft connected co-rotatably to one end of said first output shaft of said speed increaser that is opposite to said generator device and a shaft gear sleeved on and connected co-rotatably to said transmission shaft, said transmission unit further including a pivot gear sleeved on and connected co-rotatably to said pivot joint, meshing with said shaft gear and driven by said shaft gear to rotate.

17. The mechanical energy harvesting system as claimed in claim 11, wherein said speed increasing mechanism includes:
   a first unidirectional bearing sleeved on said first input shaft and co-rotatable with said first input shaft only when said first input shaft rotates in the first direction;
   a first gear sleeved on and co-rotatable with said first unidirectional bearing;
   a second unidirectional bearing sleeved on said first input shaft and co-rotatable with said first input shaft only when said first input shaft rotates in the second direction;
   a second gear sleeved on and co-rotatable with said second unidirectional bearing;
   a third gear meshing with said first gear;
   a fourth gear co-rotatable and co-axial with said third gear, and having a diameter greater than that of said third gear;
   a fifth gear meshing with said fourth gear, having a diameter smaller than that of said fourth gear, and co-rotatably connected to said output shaft; and
   a sixth gear meshing with said second gear, having a diameter smaller than that of said second gear, and co-rotatably connected to said output shaft;
   when said input shaft is driven by said flexible shaft to rotate in the first direction, said first unidirectional bearing is driven by said input shaft to rotate said first gear in the first direction so as to drive said third gear and said fourth gear to rotate in the second direction such that said fifth gear and said output shaft are driven by said fourth gear to rotate in the first direction; and
   when said input shaft is driven by said flexible shaft to rotate in the second direction, said second unidirectional bearing is driven by said input shaft to drive said second gear to rotate in the second direction so as to drive said sixth gear and said output shaft to rotate in the first direction.

18. The mechanical energy harvesting system as claimed in claim 11, further comprising:
   a torque limiting device that includes an input terminal connected to said first output shaft of said speed increaser and an output terminal; and
   a continuously variable transmission (CVT) device that includes
      a second input shaft connected to said output terminal of said torque limiting device,
      a second output shaft connected to said generator device, and
      a CVT disposed between said second input shaft and said second output shaft;
   said torque limiting device being configured to transmit the rotational kinetic energy from said first output shaft to said CVT device to drive said CVT device only when a torque of said first output shaft is smaller than a predetermined threshold;
   said CVT being configured to adjust a rotational speed of said output shaft according to the rotational speed of said second input shaft to transmit the rotational kinetic energy generated by said rotating shaft to said generator device.

* * * * *